US011443745B2

(12) United States Patent
Hirai et al.

(10) Patent No.: US 11,443,745 B2
(45) Date of Patent: Sep. 13, 2022

(54) APPARATUS CONTROL DEVICE, APPARATUS CONTROL SYSTEM, APPARATUS CONTROL METHOD, AND APPARATUS CONTROL PROGRAM

(71) Applicant: MITSUBISHI ELECTRIC CORPORATION, Tokyo (JP)

(72) Inventors: Masato Hirai, Tokyo (JP); Kenshiro Kitamura, Tokyo (JP); Miho Ishikawa, Tokyo (JP); Daisuke Iizawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 168 days.

(21) Appl. No.: 17/076,532

(22) Filed: Oct. 21, 2020

(65) Prior Publication Data

US 2021/0035584 A1 Feb. 4, 2021

Related U.S. Application Data

(63) Continuation of application No. PCT/JP2018/022932, filed on Jun. 15, 2018.

(51) Int. Cl.
*G10L 15/22* (2006.01)
*G10L 15/02* (2006.01)
(Continued)

(52) U.S. Cl.
CPC .............. *G10L 15/22* (2013.01); *G10L 15/02* (2013.01); *G10L 15/083* (2013.01); *G10L 15/1815* (2013.01); *G10L 2015/223* (2013.01)

(58) Field of Classification Search
CPC ....... G10L 15/22; G10L 15/02; G10L 15/083; G10L 15/1815; G10L 2015/223
(Continued)

(56) References Cited

U.S. PATENT DOCUMENTS 9,158,298 B2 * 10/2015 Gronbach ............... G10L 15/22
9,934,782 B2 * 4/2018 Zohar ..................... G10L 13/02
(Continued)

FOREIGN PATENT DOCUMENTS

JP 2005-107425 A 4/2005
JP 2005-284492 A 10/2005
(Continued)

OTHER PUBLICATIONS

International Search Report issued in PCT/JP2018/022932(PCT/ISA/210), dated Jul. 31, 2018.
(Continued)

*Primary Examiner* — Susan I McFadden
(74) *Attorney, Agent, or Firm* — Birch, Stewart, Kolasch & Birch, LLP

(57) ABSTRACT

Included are: an apparatus function information acquiring unit for acquiring apparatus function information in which a target apparatus and one or more target functions to be executed by the target apparatus, which are determined on the basis of uttered speech, are associated with each other; a procedure determining unit for determining one or more manual operations for executing the one or more target functions and an order of the one or more manual operations on the basis of the apparatus function information acquired by the apparatus function information acquiring unit; and an operation command transmission controlling unit for sequentially transmitting, to the target apparatus, operation commands for outputting operation response output control information corresponding to each of the one or more manual operations in accordance with the order of the one or more manual operations determined by the procedure determining unit.

14 Claims, 14 Drawing Sheets

(51) Int. Cl.
*G10L 15/08* (2006.01)
*G10L 15/18* (2013.01)

(58) Field of Classification Search
USPC .......................................................... 704/270
See application file for complete search history.

(56) References Cited

U.S. PATENT DOCUMENTS

| | | | |
|---|---|---|---|
| 10,741,960 B2* | 8/2020 | Richardson | .............. H02G 3/16 |
| 10,978,067 B2* | 4/2021 | An | ........................... G10L 15/22 |
| 2015/0112667 A1 | 4/2015 | Kozuka et al. | |

FOREIGN PATENT DOCUMENTS

| JP | 2008-217026 A | 9/2008 |
|---|---|---|
| JP | 2009-104025 A | 5/2009 |
| JP | 2014-43964 A | 3/2014 |
| JP | 2016-66930 A | 4/2016 |
| JP | 2016-163636 A | 9/2016 |
| JP | 2018-88723 A | 6/2018 |

OTHER PUBLICATIONS

Japanese Office Action dated Nov. 20, 2018 in Japanese Patent Application No. 2018-555780.

* cited by examiner

FIG. 2

| Speech Recognition Result (Content of Utterance) | Household Electrical Appliance | Function |
|---|---|---|
| Microwave Oven | Microwave Oven | — |
| 100 Watts | Microwave Oven | At 100 Watts |
| 200 Watts | Microwave Oven | At 200 Watts |
| ⋮ | ⋮ | ⋮ |
| 500 Watts | Microwave Oven | At 500 Watts |
| ⋮ | ⋮ | ⋮ |
| 10 sec. | Microwave Oven | Heating Time of 10 sec. |
| 20 sec. | Microwave Oven | Heating Time of 20 sec. |
| ⋮ | ⋮ | ⋮ |
| 1 min. | Microwave Oven | Heating Time of 1 min. |
| 2 min. | Microwave Oven | Heating Time of 2 min. |
| ⋮ | ⋮ | ⋮ |
| Manual | Microwave Oven | Manual Mode |
| Milk | Microwave Oven | Drinks Mode |
| ⋮ | ⋮ | ⋮ |
| Lukewarm | Microwave Oven | Preset Temperature of 50 °C |
| Hot | Microwave Oven | Preset Temperature of 90 °C |
| ⋮ | ⋮ | ⋮ |
| IH Cooking Heater | IH Cooking Heater | — |
| Right Stove | IH Cooking Heater | Right Stove |
| Left Stove | IH Cooking Heater | Left Stove |
| ⋮ | ⋮ | ⋮ |
| Heating Power 1 | IH Cooking Heater | Heating Power 1 |
| ⋮ | ⋮ | ⋮ |
| Heating Power 3 | IH Cooking Heater | Heating Power 3 |
| Heating Power 4 | IH Cooking Heater | Heating Power 4 |
| Heating Power 5 | IH Cooking Heater | Heating Power 5 |
| ⋮ | ⋮ | ⋮ |
| Heating Power 8 | IH Cooking Heater | Heating Power 8 |
| ⋮ | ⋮ | ⋮ |
| Low Heat | IH Cooking Heater | Heating Power 1 |
| Medium Heat | IH Cooking Heater | Heating Power 4 |
| High Heat | IH Cooking Heater | Heating Power 8 |
| ⋮ | ⋮ | ⋮ |
| Rice Cooker | Rice Cooker | ⋮ |
| ⋮ | ⋮ | ⋮ |
| Television | Television | ⋮ |
| ⋮ | ⋮ | ⋮ |
| Air Conditioner | Air Conditioner | ⋮ |
| ⋮ | ⋮ | ⋮ |

FIG. 3

| Household Electrical Appliance | Function | Manual Operation Procedure |
|---|---|---|
| Microwave Oven | Manual Mode | Press "Microwave" Button Twice |
| | At 500 Watts | Press "- (minus)" Button Once |
| | Heating Time of 2 min. | Press "Minute" Button Twice |
| | Drinks Mode | Press "Microwave" Button Three Times |
| | Preset Temperature of 50 °C | Press "- (minus)" Button Twice |
| | ⋮ | ⋮ |
| | Start Heating | Press "Start" Button Once |
| IH Cooking Heater | Right Stove | Turn on "Rotary Encoder of Right Stove" |
| | Left Stove | Turn on "Rotary Encoder of Left Stove" |
| | Heating Power 8 | Turn "Rotary Encoder" to Positive Eight Times |
| | ⋮ | ⋮ |
| | Heating Power 5 | Turn "Rotary Encoder" to Positive Five Times |
| | Heating Power 4 | Turn "Rotary Encoder" to Positive Four Times |
| | Heating Power 3 | Turn "Rotary Encoder" to Positive Three Times |
| | ⋮ | ⋮ |
| | Heating Power 1 | Turn "Rotary Encoder" to Positive Once |
| | ⋮ | ⋮ |
| | Start | Press "Start" Button Once |
| Rice Cooker | ⋮ | ⋮ |
| | ⋮ | ⋮ |
| Television | ⋮ | ⋮ |
| | ⋮ | ⋮ |
| Air Conditioner | ⋮ | ⋮ |
| | ⋮ | ⋮ |

FIG. 4

Operation Command of "Microwave" Button
↓(0.2 sec.)
Operation Command of "Microwave" Button
↓(0.2 sec.)
Operation Command of "- (minus)" Button
↓(0.2 sec.)
Operation Command of "Minute" Button
↓(0.2 sec.)
Operation Command of "Minute" Button
↓(0.2 sec.)
Operation Command of "Start" Button

FIG. 10

```
Operation Command of "Microwave" Button
↓(0.1 sec.)
Operation Command of "Microwave" Button
↓
↓(0.2 sec.)
Operation Command of "- (minus)" Button
↓
↓(0.2 sec.)
Operation Command of "Minute" Button
↓(0.1 sec.)
Operation Command of "Minute" Button
↓
↓(0.2 sec.)
Operation Command of "Start" Button
```

Return to 0 from 3, and Then Increment Five Times from 0 to 5

Increment Twice from 3 to 5

APPARATUS CONTROL DEVICE, APPARATUS CONTROL SYSTEM, APPARATUS CONTROL METHOD, AND APPARATUS CONTROL PROGRAM

CROSS REFERENCE TO RELATED APPLICATION

This application is a Continuation of PCT International Application No. PCT/JP2018/022932, filed on Jun. 15, 2018, which is hereby expressly incorporated by reference into the present application.

TECHNICAL FIELD

The present invention relates to an apparatus control device, an apparatus control system, an apparatus control method, and an apparatus control program for controlling an apparatus on the basis of uttered speech.

BACKGROUND ART

In the related art, there is known technology for controlling an apparatus on the basis of uttered speech of a user. With such technology, even with regard to a function that requires multiple manual operations when an apparatus is manually operated, a user can cause the apparatus to execute the function with a single time of utterance. Hereinafter, the operation of an apparatus by a user's utterance is referred to as "speech operation".

For example, Patent Literature 1 discloses a speech recognition control device that repeatedly transmits, to a controlled apparatus, a control signal for multiple times which corresponds to a recognized speech command upon receipt of the signal corresponding to the speech command once in a case where the speech command recognized on the basis of uttered speech of a user is a repetition command.

CITATION LIST

Patent Literature

Patent Literature 1: JP 2009-104025 A

SUMMARY OF INVENTION

Technical Problem

In the related art, there is a disadvantage that it is not possible to confirm that, when a user instructs, by a single time of utterance, execution of one or more functions that require multiple manual operations in a case of manual operation, the functions corresponding to the respective multiple manual operations have been executed in the apparatus. The speech recognition control device disclosed in Patent Literature 1 merely causes an apparatus to repeat the same function multiple times with a single time of utterance by a user, and thus still does not solve the above disadvantage.

The present invention has been devised in order to solve the above-described disadvantage, and it is an object of the present invention to provide an apparatus control device that enables confirmation that functions corresponding to respective multiple manual operations have been executed in the apparatus, when a user instructs, by a single time of utterance, execution of the one or more functions that require the multiple manual operations in a case of manual operation.

Solution to Problem

An apparatus control device according to the present invention controls an apparatus on a basis of uttered speech, the apparatus control device including: processing circuitry performing a process of: acquiring apparatus function information in which a target apparatus and one or more target functions to be executed by the target apparatus, which are determined on a basis of the uttered speech, are associated with each other; determining one or more manual operations for executing the one or more target functions and an order of the one or more manual operations on a basis of the apparatus function information acquired; and sequentially transmitting, to the target apparatus, operation commands for outputting operation response output control information corresponding to each of the one or more manual operations for each of the one or more manual operations in accordance with the order of the one or more manual operations determined.

Advantageous Effects of Invention

According to the present invention, it is possible to confirm that the functions corresponding to respective multiple manual operations have been executed in the apparatus, when a user instructs, by a single time of utterance, execution of the one or more functions that require the multiple manual operations in a case of manual operation.

BRIEF DESCRIPTION OF DRAWINGS

FIG. 2 is a table for explaining an example of apparatus related information stored in an apparatus function DB in the first embodiment.

FIG. 3 is a diagram for explaining an example of procedure information stored in a procedure DB in the first embodiment.

FIG. 4 is a diagram illustrating a concept in which each operation command is transmitted at intervals of 0.2 seconds in the first embodiment.

FIG. 10 is a diagram illustrating a concept of each operation command transmitted at different intervals depending on an operation indicated by operation information included in the operation command in the first embodiment.

FIG. 14 is a diagram for explaining a concept of a difference between the operation of the apparatus control device in the first embodiment and the operation of the apparatus control device in the second embodiment when the heating power is changed from heating power 3 to heating power 5 in an IH cooking heater.

DESCRIPTION OF EMBODIMENTS

Hereinafter, embodiments of the present invention will be described in detail with reference to the drawings.

First Embodiment

An apparatus control device 1 according to the first embodiment is capable of causing an apparatus to execute a function based on uttered speech when a user performs speech operation on the apparatus, and to output a response as if the user has executed the function by manual operation.

Note that it is assumed in the following description that, as an example, an apparatus that a user causes to execute a function by uttered speech is a household electrical appliance.

Figure 1:
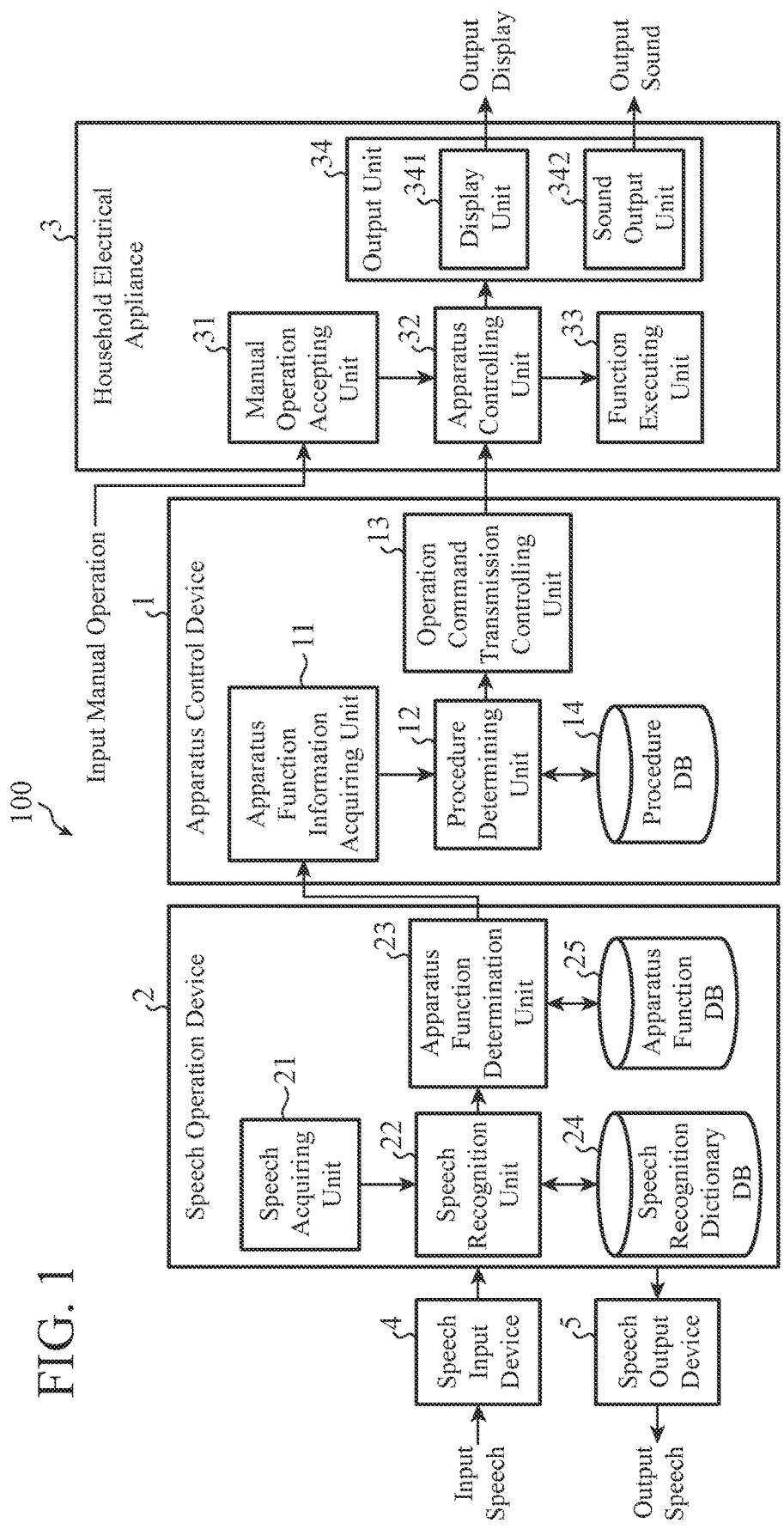
FIG. 1 is a diagram for explaining an exemplary configuration of an apparatus control system including an apparatus control device according to a first embodiment.

FIG. 1 is a diagram for explaining an exemplary configuration of an apparatus control system 100 including the apparatus control device 1 according to the first embodiment.

The apparatus control system 100 includes the apparatus control device 1, a speech operation device 2, a household electrical appliance 3, a speech input device 4, and a speech output device 5. The speech operation device 2 is connected with the speech input device 4 and the speech output device 5 via a network. The speech operation device 2 is connected with the apparatus control device 1 via a network. The apparatus control device 1 is connected with the speech operation device 2 and the household electrical appliance 3 via a network.

The household electrical appliance 3 may be any electric appliance used in households such as a microwave oven, an IH cooking heater, a rice cooker, a television, or an air conditioner.

Although only one household electrical appliance 3 included in the apparatus control system 100 is illustrated in FIG. 1, two or more household electrical appliances 3 may be connected in the apparatus control system 100.

The speech operation device 2 determines a household electrical appliance 3 to be controlled on the basis of uttered speech of a user, and determines one or more functions to be executed by the household electrical appliance 3 among the functions of the household electrical appliance 3.

In the first embodiment, the household electrical appliance 3 to be controlled, which is determined on the basis of the uttered speech of the user, is referred to as "target apparatus". In addition, among the functions of the "target apparatus", the function to be executed on the basis of the uttered speech of the user is also referred to as "target function".

The speech operation device 2 transmits, to the apparatus control device 1, information in which the determined target apparatus is associated with one or more target functions (hereinafter, referred to as "apparatus function information").

The apparatus control device 1 determines an operation procedure when one or more target functions of the target apparatus are executed by manual operation on the basis of the apparatus function information transmitted from the speech operation device 2. Then, according to the determined operation procedure, the apparatus control device 1 sequentially transmits, to the target apparatus for each operation, an operation command for outputting operation response output control information corresponding to each operation at set intervals.

The household electrical appliance 3 executes its own function on the basis of the operation command transmitted from the apparatus control device 1.

Each time the household electrical appliance 3 receives the operation command transmitted from the apparatus control device 1, the household electrical appliance 3 outputs operation response output control information corresponding to the operation command to an output unit 34 (described later), and outputs sound or displays information corresponding to the operation based on the operation command.

The household electrical appliance 3 can also accept manual operation by the user and execute its own function according to the accepted manual operation. Also in this case, each time the household electrical appliance 3 accepts manual operation, the household electrical appliance 3 outputs an operation response output control signal corresponding to the accepted manual operation to the output unit 34, and outputs sound or displays information corresponding to the accepted manual operation.

Note that in a case where the operation based on the operation command transmitted from the apparatus control device 1 and the accepted manual operation are the same operation, the sound output by the household electrical appliance 3 and the content of the information displayed by the household electrical appliance 3 are the same sound and the same information.

The speech input device 4 is a microphone or the like that can accept uttered speech of a user and input a speech signal to the speech operation device 2.

The speech output device 5 is a speaker or the like that can output speech to the outside of the device.

The speech input device 4 and the speech output device 5 may be included in a so-called smart speaker. In this case, the speech output device 5 can output, for example, a response to the uttered speech of the user input by the user using the speech input device 4.

Exemplary configurations of the apparatus control device 1, the speech operation device 2, and the household electrical appliance 3 will be each described.

First, an exemplary configuration of the speech operation device 2 will be described.

As illustrated in FIG. 1, the speech operation device 2 includes a speech acquiring unit 21, a speech recognition unit 22, an apparatus function determining unit 23, a speech recognition dictionary database (DB) 24, and an apparatus function DB 25.

The speech acquiring unit 21 acquires uttered speech from the speech input device 4.

The user utters, to the speech input device 4, an instruction to execute one or more functions of the household electrical appliance 3. For example in a case where the household electrical appliance 3 is a microwave oven, the user utters "use the microwave oven to heat up manually at 500 watts for two minutes" to the speech input device 4 to input an execution instruction to cause the microwave oven to execute the function of heating for two minutes at a preset temperature of 500 watts in the manual mode. In addition, for example, the user utters "use the microwave oven to warm up milk" to input an execution instruction to cause the microwave oven to execute the function of heating in a drinks mode so that the milk will be heated to 50° C. For example in a case where the household electrical appliance 3 is an IH cooking heater, the user utters "use the IH cooking heater and set the right stove to medium heat" to input an execution instruction to cause the IH cooking heater to execute the function of setting the heating power of the right stove to heating power 4.

The speech input device 4 accepts the uttered speech uttered by the user as in the examples described above. The speech acquiring unit 21 acquires the uttered speech of the user accepted by the speech input device 4.

The speech acquiring unit 21 outputs the acquired uttered speech to the speech recognition unit 22.

The speech recognition unit 22 collates the uttered speech acquired by the speech acquiring unit 21 with the speech recognition dictionary DB 24, and recognizes the content of utterance.

The speech recognition dictionary DB 24 is a database that stores a speech recognition dictionary for performing speech recognition.

The speech recognition unit 22 performs speech recognition using the speech recognition dictionary stored in the speech recognition dictionary DB 24, and recognizes the content of utterance. The speech recognition unit 22 is only required to recognize the content of utterance using existing speech recognition technology.

The speech recognition unit 22 may recognize the content of utterance by inferring the user's intention, or may recognize the content of utterance using artificial intelligence. In these cases, the speech recognition unit 22 is only required to use existing intention inference technology and artificial intelligence technology.

The speech recognition unit 22 is only required to be able to recognize the content of utterance on the basis of the uttered speech, and a method for recognizing the content of utterance is not limited.

For example, to explain using the above example, for the uttered speech "use the microwave oven to heat up manually at 500 watts for two minutes", the speech recognition unit 22 recognizes content of the utterance of "microwave", "manual", "500 watts", and the "two minutes". Furthermore, for example for the uttered speech "use the microwave oven to warm up milk", the speech recognition unit 22 recognizes the content of the utterance of "microwave", "milk", and "warm up". As another example, for the uttered speech "use the IH cooking heater and set the right stove to medium heat" the speech recognition unit 22 recognizes the content of the utterance of "IH cooking heater", "right stove", and "medium heat".

The speech recognition unit 22 outputs the recognition result of the content of the utterance to the apparatus function determining unit 23.

The apparatus function determining unit 23 collates the recognition result of the content of the utterance output from the speech recognition unit 22 with the apparatus function DB 25, and determines the target apparatus and one or more target functions.

The apparatus function DB 25 stores apparatus related information. The apparatus related information is information in which the content of utterance is associated with the household electrical appliance 3 and the content of utterance are associated with one or more functions of the household electrical appliance 3. It is assumed that apparatus related information is generated in advance and stored in the apparatus function DB 25 for one or more household electrical appliances 3 that can be controlled by uttered speech.

Here, FIG. 2 is a diagram for explaining an example of apparatus related information stored in the apparatus function DB 25 in the first embodiment.

As illustrated in FIG. 2, in the apparatus related information, the content of utterance as a result of speech recognition are associated with household electrical appliances 3 and functions. For example, in a case where the content of utterance output from the speech recognition unit 22 includes "microwave", "manual", "500 watts", and "two minutes", the apparatus function determining unit 23 determines on the basis of the apparatus related information that the target apparatus is a "microwave". The apparatus function determining unit 23 further determines that the target functions are "manual mode", "500 watts", and "heating time of two minutes" of the "microwave".

For example, in a case where the content of utterance output from the speech recognition unit 22 includes "microwave", "milk", and "warm up", the apparatus function determining unit 23 determines on the basis of the apparatus related information that the target apparatus is the "microwave". The apparatus function determining unit 23 further determines that the target functions are "drinks mode" and "a preset temperature of 50° C." of the "microwave".

For example, in a case where the content of utterance output from the speech recognition unit 22 includes "IH cooking heater", "right stove", and "medium heat", the apparatus function determining unit 23 determines on the basis of the apparatus related information that the target apparatus is the "IH cooking heater". The apparatus function determining unit 23 further determines that the target functions are the "right stove" and "heating power 4" of the "IH cooking heater".

The apparatus function determining unit 23 generates apparatus function information in which a target apparatus is associated with one or more target functions, and transmits the generated apparatus function information to the apparatus control device 1.

In the above example, the apparatus function determining unit 23 generates apparatus function information in which the information of "microwave" is associated with the information of "manual mode", "at 500 watts", and "heating time of two minutes", and transmits the apparatus function information to the apparatus control device 1. Alternatively, the apparatus function determining unit 23 generates apparatus function information in which the information of the "microwave" is associated with the information of the "drinks mode" and the "preset temperature of 50° C." and transmits the apparatus function information to the apparatus control device 1. Alternatively, the apparatus function determining unit 23 generates apparatus function information in which the information of "IH cooking heater" is associated with the information of "right stove" and "heating power 4", and transmits the apparatus function information to the apparatus control device 1.

Note that, in the first embodiment, the speech recognition dictionary DB 24 and the apparatus function DB 25 are included in the speech operation device 2 as illustrated in FIG. 1; however, this is merely an example. The speech recognition dictionary DB 24 and the apparatus function DB 25 may be provided externally to the speech operation device 2 at a location where the speech operation device 2 can refer.

Next, an exemplary configuration of the apparatus control device 1 will be described.

As illustrated in FIG. 1, the apparatus control device 1 includes an apparatus function information acquiring unit 11, a procedure determining unit 12, an operation command transmission controlling unit 13, and a procedure DB 14.

The apparatus function information acquiring unit 11 acquires the apparatus function information transmitted from the speech operation device 2.

The apparatus function information acquiring unit 11 outputs the acquired apparatus function information to the procedure determining unit 12.

The procedure determining unit 12 refers to the procedure DB 14 on the basis of the apparatus function information acquired by the apparatus function information acquiring unit 11 to determine one or more operations for executing one or more target functions that the user executes by manual operation and the order of the one or more operations.

The procedure DB 14 stores procedure information in which functions of the household electrical appliance 3 and operations performed when a user executes the functions in the household electrical appliance 3 by manual operation and the order of the operations are defined in association with each other for each household electrical appliance 3. It is assumed that the procedure information is generated and stored in the procedure DB 14 in advance.

Here, FIG. 3 is a diagram for explaining an example of procedure information stored in the procedure DB 14 in the first embodiment.

Note that, in the procedure information illustrated in FIG. 3, the information of the order of operations is omitted since it is assumed that operations are defined in the order of operations for executing functions for each household electrical appliance 3; however, the content of an operation for executing a function may be assigned with the order of the operation in the procedure information.

As illustrated in FIG. 3, in the procedure information, in a case where the same operation is repeated multiple times for a function, the operation repeated multiple times is defined collectively.

In the operation procedure of the procedure information illustrated in FIG. 3, how many times an operation is to be performed from the initial value is defined for a function. The procedure determining unit 12, which will be described later, determines the number of operations required for execution of a function based on the apparatus function information from the initial value on the basis of the procedure information as illustrated in FIG. 3. Note that the initial value is set in advance for each function.

The procedure determining unit 12 determines the content of one or more operations for execution of one or more target functions and the order of the one or more operations on the basis of the apparatus function information acquired by the apparatus function information acquiring unit 11 and the procedure information as illustrated in FIG. 3.

Using the above example, for example, it is assumed that, in the apparatus function information acquired by the apparatus function information acquiring unit 11, the information of the "microwave" is associated with the information of the "manual mode", the "at 500 watts" and "heating time of two minutes". In this case, the procedure determining unit 12 determines that the operation is performed in the order of pressing the "microwave" button twice->pressing the "– (minus)" button once->pressing the "minute" button twice->pressing the "start" button once.

In other words, it is determined that if the function instructed by the uttered speech "use the microwave oven to heat up manually at 500 watts for two minutes" is executed by manual operation, operation of pressing the "microwave" button twice->pressing the "– (minus)" button once->pressing the "minute" button twice->pressing the "start" button once is executed.

Note that the procedure information defines, as one of the functions executed in each household electrical appliance 3, a function of instructing the start of the final operation of the appliance (hereinafter, referred to as a "start function"). In a case where a user manually operates a target apparatus, first, the apparatus is caused to execute a function for setting operating conditions of the apparatus (hereinafter, referred to as a "setting function") by one or more necessary operations. Then, when the user finally performs an operation for instructing the start of the operation, the apparatus executes the start function, thereby starting the operation based on set conditions for the first time. In consideration of such a manual operation by the user, it is assumed that also in the case of speech operation, a start function is defined in the procedure information illustrated in FIG. 3 so that the operation is automatically started by the user's utterance.

However, the start function is not necessarily defined in the procedure information, and the user may separately issue an instruction to finally start execution of the operation by manual operation. The start function may not be defined depending on a target apparatus operated by the user. For example, in a case where a user operates an IH cooking heater, there are cases where the start function is not defined. That is, in a case where the apparatus function information includes the information of "IH cooking heater", there are cases where the start function is not defined in the procedure information. Note that, in FIG. 3, it is assumed that the start function is also defined in the case of the "IH cooking heater".

The procedure determining unit 12 adds an operation corresponding to the function of instructing the start of execution at the end of the operation determined on the basis of the apparatus function information. In FIG. 3, it is defined that in the microwave oven, the function of instructing the start of execution is "start heating", and the operation for executing "start heating" is pressing the "start" button once.

In procedure information, operations necessary for execution of a function from the initial value predetermined for each function is defined. Specifically, 0 minutes 00 seconds is set as the initial value of heating time, and the operation performed for the state of 0 minutes 00 seconds and the function executed by the operation are defined in association with each other. In the above example, in order to execute the function of "heating time of two minutes", the operation of pressing the "minute" button twice from the state of 0 minutes 00 seconds is necessary.

The procedure determining unit 12 outputs, to the operation command transmission controlling unit 13, for each of the determined one or more functions, information indicating one or more operations corresponding to the function (hereinafter, referred to as "function-specific operation count information") and information indicating the order of the one or more operations (hereinafter, referred to as "order information"). Specifically, for example, the procedure determining unit 12 adds order information to each piece of function-specific operation count information, and outputs the information to the operation command transmission controlling unit 13. The information output by the procedure determining unit 12 to the operation command transmission controlling unit 13 in which order information is added to function-specific operation count information is hereinafter also referred to as "manual operation procedure information".

In the above example, the procedure determining unit 12 outputs, to the operation command transmission controlling unit 13, manual operation procedure information in which order information of "#1" is added to function-specific operation count information of pressing the "microwave" button twice, order information of "#2" is added to function-specific operation count information of pressing the "− (minus)" button once, order information of "#3" is added to function-specific operation count information of pressing the "minute" button twice, and order information of "#4" is added to function-specific operation count information of pressing the "start" button once.

Let us also assume that, for example, information of "microwave" is associated with information of "drinks mode" and "preset temperature of 50° C." in the apparatus function information acquired by the apparatus function information acquiring unit 11. In this case, the procedure determining unit 12 determines that the operation is performed in the order of pressing the "microwave" button three times->pressing the "− (minus)" button twice->pressing the "start" button once.

In other words, it is determined that operations of pressing the "microwave" button three times->pressing the "− (minus)" button twice->pressing the "start" button once are to be executed if the function instructed by the uttered speech of "use the microwave oven to warm up milk" is executed by manual operation.

The procedure determining unit 12 outputs, to the operation command transmission controlling unit 13, manual operation procedure information in which order information of "#1" is added to function-specific operation count information of pressing the "microwave" button three times, order information of "#2" is added to function-specific operation count information of pressing the "− (minus)" button twice, and order information of "#3" is added to function-specific operation count information of pressing the "start" button once.

Alternatively, for example, let us assume that the apparatus function information acquired by the apparatus function information acquiring unit 11 is apparatus function information in which information of the "IH cooking heater" is associated with information of the "right stove" and "heating power 4".

Since the apparatus function information includes the information of the "IH cooking heater", there are cases where the start function is not defined in the procedure information. In this case, the procedure determining unit 12 determines that the operation is performed in the order of turning on the "rotary encoder of the right stove"->turning the "rotary encoder" to positive four times.

In other words, if the function indicated by the uttered speech of "use the IH cooking heater and set the right stove to medium heat" is executed by manual operation, it is determined that the operation of turning on the "rotary encoder of the right stove"->turning the "rotary encoder" to positive four times is executed.

The procedure determining unit 12 outputs, to the operation command transmission controlling unit 13, manual operation procedure information in which order information of "#1" is added to function-specific operation count information of turning on the "rotary encoder of the right stove", and order information of "#2" is added to function-specific operation count information of turning the "rotary encoder" to positive four times.

Alternatively, for example, in a case where the start function is defined in the procedure information (see FIG. 3), the procedure determining unit 12 determines that the operation is performed in the order of turning on the "rotary encoder of the right stove"->turning the "rotary encoder" to positive four times->pressing the "start" button once.

In other words, if the function indicated by the uttered speech of "use the IH cooking heater and set the right stove to medium heat" is executed by manual operation, it is determined that the operation of turning on the "rotary encoder of the right stove"->turning the "rotary encoder" to positive four times->pressing the "start" button once is executed.

The procedure determining unit 12 outputs, to the operation command transmission controlling unit 13, manual operation procedure information in which order information of "#1" is added to function-specific operation count information of turning on the "rotary encoder of the right stove", order information of "#2" is added to function-specific operation count information of turning the "rotary encoder" to positive four times, and order information of "#3" is added to function-specific operation count information of pressing the "start" button once.

The operation command transmission controlling unit 13 transmits, to the household electrical appliance 3 that is a target apparatus, an operation command for each operation in accordance with the order of operations determined by the procedure determining unit 12 on the basis of the manual operation procedure information output from the procedure determining unit 12.

An operation command includes operation information, and is for causing the household electrical appliance 3 to output, on the basis of the operation command, operation response output control information that corresponds to the operation specified by the operation command. In the first embodiment, "operation information" included in an operation command is information indicating the specific content of operation based on manual operation procedure information. For example in a case where the manual operation procedure information includes function-specific operation count information of pressing the "microwave" button three times, the specific content of the operation indicated by the function-specific operation count information is to press the "microwave" button. The operation command transmission controlling unit 13 includes the "operation information" indicating pressing the "microwave" button in the operation command.

The operation command transmission controlling unit 13 transmits each operation command at a preset interval (first interval). The first interval is set in advance and is a short interval such as 0.2 seconds.

Explaining specifically using the above example, for example, let us assume that the procedure determining unit 12 outputs manual operation procedure information in which order information of "#1" is added to function-specific operation count information of pressing the "microwave" button twice, order information of "#2" is added to function-specific operation count information of pressing the "– (minus)" button once, order information of "#3" is added to function-specific operation count information of pressing the "minute" button twice, and order information of "#4" is added to function-specific operation count information of pressing the "start" button once. In this case, the operation command transmission controlling unit 13 transmits, to the household electrical appliance 3 at intervals of 0.2 seconds, an operation command including operation information indicating that the "microwave" button is pressed, an operation command including operation information indicating that the "microwave" button is pressed, an operation command including operation information indicating that the "– (minus)" button is pressed, an operation command including operation information indicating that the "minute" button is pressed, an operation command including operation information indicating that the "minute" button is pressed, and an operation command including operation information indicating that the "start" button is pressed in the order mentioned. FIG. 4 is a diagram illustrates a concept in which each operation command is transmitted at intervals of 0.2 seconds.

As another example, let us assume that the procedure determining unit 12 outputs manual operation procedure information in which order information of "#1" is added to function-specific operation count information of pressing the "microwave" button three times, order information of "#2" is added to function-specific operation count information of pressing the "– (minus)" button twice, order information of "#3" is added to function-specific operation count information of pressing the "start" button once. In this case, the operation command transmission controlling unit 13 transmits, to the household electrical appliance 3 at intervals of 0.2 seconds, an operation command including operation information indicating that the "microwave" button is pressed, an operation command including operation information indicating that the "microwave" button is pressed, an operation command including operation information indicating that the "microwave" button is pressed, an operation command including operation information indicating that the "– (minus)" button is pressed, an operation command including operation information indicating that the "– (minus)" button is pressed, and an operation command including operation information indicating that the "start" button is pressed in the order mentioned. Illustration of a concept in which each operation command is transmitted at intervals of 0.2 seconds is omitted.

Let us also assume that the procedure determining unit 12 outputs manual operation procedure information in which order information of "#1" is added to function-specific operation count information of turning on the "rotary encoder of the right stove", and order information of "#2" is added to function-specific operation count information of turning the "rotary encoder" to positive four times. In this case, the operation command transmission controlling unit 13 transmits, to the household electrical appliance 3 at intervals of 0.2 seconds, operation commands including operation information of turning on the "rotary encoder of the right stove", an operation command including operation information for turning the "rotary encoder" to positive, an operation command including operation information for turning the "rotary encoder" to positive, an operation command relating to operating information of turning the "rotary encoder" to positive, and an operation command including operation information of turning the "rotary encoder" to positive in the order mentioned. Illustration of a concept in which each operation command is transmitted at intervals of 0.2 seconds is omitted.

Also, for example, let us assume that the procedure determining unit 12 outputs manual operation procedure information in which order information of "#1" is added to function-specific operation count information of turning on the "rotary encoder of the right stove", order information of "#2" is added to function-specific operation count information of turning the "rotary encoder" to positive four times, and order information of "#3" is added to function-specific operation count information of pressing the "start" button once. In this case, the operation command transmission controlling unit 13 transmits, to the household electrical appliance 3 at intervals of 0.2 seconds, an operation command including operation information of turning on the "rotary encoder of the right stove", an operation command including operation information for turning the "rotary encoder" to positive, an operation command including operation information for turning the "rotary encoder" to positive, an operation command relating to operating information of turning the "rotary encoder" to positive, an operation command including operation information of turning the "rotary encoder" to positive, and an operation command including operation information of pressing the "start" button in the order mentioned. Illustration of a concept in which each operation command is transmitted at intervals of 0.2 seconds is omitted.

Note that details will be described later regarding the operation by the household electrical appliance 3 of outputting operation response output control information corresponding to the operation specified by an operation command on the basis of the operation command transmitted by the operation command transmission controlling unit 13.

In the first embodiment, as illustrated in FIG. 1, the procedure DB 14 is included in the apparatus control device 1; however, this is merely an example. The procedure DB 14 may be provided outside the apparatus control device 1 at a location where the apparatus control device 1 can refer to.

Next, an exemplary configuration of the household electrical appliance 3 will be described.

The household electrical appliance 3 includes a manual operation accepting unit 31, an apparatus controlling unit 32, a function executing unit 33, and an output unit 34 as illustrated in FIG. 1.

The output unit 34 includes a display unit 341 and a sound output unit 342.

The manual operation accepting unit 31 accepts manual operation. A user operates, for example, an input device (not illustrated) of the household electrical appliance 3 to perform an operation for executing one or more functions of the household electrical appliance 3. The manual operation accepting unit 31 accepts the operation that the user has performed using the input device.

For example, in a case where the input device is a touch panel, the user touches the touch panel, and the manual operation accepting unit 31 accepts operation information based on the operation that the user has performed by touching the touch panel.

Note that an operation that the user specifically performs by manual operation in order to execute a certain function of the household electrical appliance 3 is as in the procedure information defined in FIG. 3. For example, let us assume that the user wants to perform manual operation for heating up for two minutes at 500 watts in a manual mode using the microwave oven. In this case, the user operates in the order of pressing the "microwave" button of the microwave twice->pressing the "– (minus)" button once->pressing the "minute" button twice->pressing the "start" button once.

Each time a manual operation is accepted, the manual operation accepting unit 31 generates operation commands related to the accepted operation, and outputs the generated operation commands to the apparatus controlling unit 32. The content of the operation commands output by the manual operation accepting unit 31 is similar to the content of the operation commands transmitted by the operation command transmission controlling unit 13 described above.

In the above example, the manual operation accepting unit 31 outputs, to the apparatus controlling unit 32, an operation command including operation information indicating that the "microwave" button is pressed, an operation command including operation information indicating that the "microwave" button is pressed, an operation command including operation information indicating that the "– (minus)" button is pressed, an operation command including operation information indicating that the "minute" button is pressed, an operation command including operation information indicating that the "minute" button is pressed, and an operation command including operation information indicating that the "start" button is pressed in the order mentioned.

When the operation commands are transmitted from the operation command transmission controlling unit 13 of the apparatus control device 1, the apparatus controlling unit 32 acquires the transmitted operation commands, and outputs operation response output control information to the output unit 34 each time an operation command is acquired. The apparatus controlling unit 32 also outputs a function execution instruction to the function executing unit 33 each time an operation command is acquired.

In addition, also in the case where the operation commands are output from the manual operation accepting unit 31, the apparatus controlling unit 32 performs similar operations to those in the case where the operation commands are transmitted from the operation command transmission controlling unit 13. For description of specific operation, its redundant explanation is omitted.

When the function execution instruction is output from the apparatus controlling unit 32, the function executing unit 33 executes the function of the household electrical appliance 3 instructed by the function execution instruction.

The output unit 34 outputs sound based on the operation response output control information output from the apparatus controlling unit 32, or displays information based on the operation response output control information output from the apparatus controlling unit 32.

The display unit 341 of the output unit 34 is a display device such as a display, and displays information in accordance with the operation response output control information output from the apparatus controlling unit 32.

The apparatus controlling unit 32 can output operation response output control information for changing information to be displayed depending on operation information included in an operation command.

The sound output unit 342 of the output unit 34 is a speech output device such as a speaker, and outputs sound in accordance with the operation response output control information output from the apparatus controlling unit 32.

The apparatus controlling unit 32 can output operation response output control information for changing output sound depending on operation information included in an operation command. Note that it is not essential for the apparatus controlling unit 32 to change output sound. Whether or not the apparatus controlling unit 32 changes the output sound depends on the functions that a target apparatus originally has. For example, in a case where the target apparatus originally has a function of outputting the same sound for multiple buttons, the apparatus controlling unit 32 outputs operation response output control information for outputting the same sound regardless of the operation information. Meanwhile, for example, in a case where a target apparatus originally has a function of outputting different sound for each button, the apparatus controlling unit 32 outputs, depending on the operation information, operation response output control information for changing output sound so as to be sound that the target apparatus originally outputs. In the first embodiment, description will be given assuming that a target apparatus has a function of originally outputting different sound for each button.

A concrete conception of the screen displayed by the display unit 341 and a concrete conception of the sound output by the sound output unit 342 will be described later.

Note that, in the first embodiment, the output unit 34 is included in the household electrical appliance 3 as illustrated in FIG. 1; however, this is merely an example. The output unit 34 may be provided at a place external to the household electrical appliance 3 where the user can confirm the display or the sound.

Furthermore, in the first embodiment, the output unit 34 includes the display unit 341 and the sound output unit 342 as illustrated in FIG. 1, and the display unit 341 is a display; however, it is not limited thereto. For example, the display unit 341 may be a light emitting unit (not illustrated) such as an LED. In this case, the light emitting unit emits light in accordance with the operation response output control information output from the apparatus controlling unit 32. The apparatus controlling unit 32 can also output operation response output control information for changing the blinking manner of the light emitting unit depending on operation information included in an operation command.

The operation of the apparatus control device 1 according to the first embodiment will be described.

Figure 5:
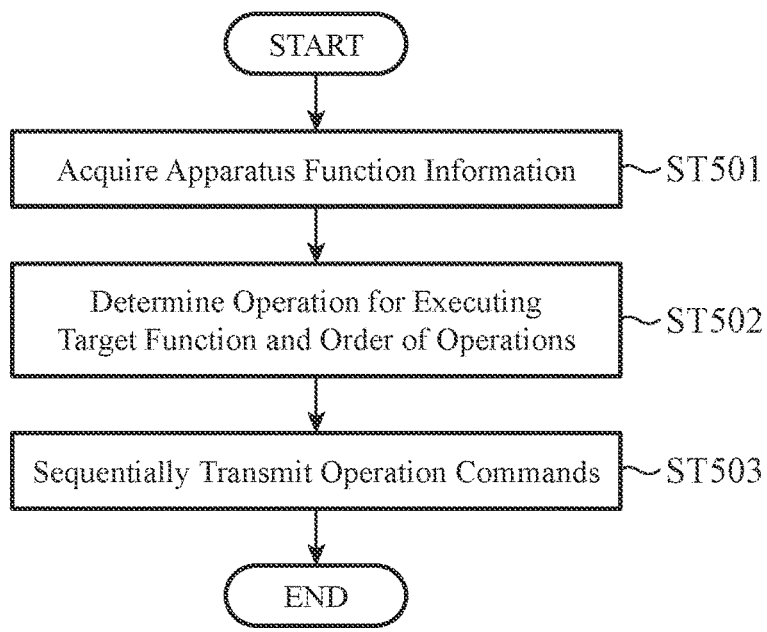
FIG. 5 is a flowchart for explaining exemplary operation of the apparatus control device according to the first embodiment.

FIG. 5 is a flowchart for explaining exemplary operation of the apparatus control device 1 according to the first embodiment.

In the following, it is assumed as an example that the user utters "use the microwave oven to heat up manually at 500 watts for two minutes" and causes the microwave oven to execute the heating function of 500 watts for two minutes in the manual mode.

Before the operation of the apparatus control device 1 illustrated in FIG. 5 is executed, the speech operation device 2 determines the target apparatus and one or more target functions to be executed in the target apparatus on the basis of uttered speech of the user and executes an operation of generating apparatus function information.

First, the operation of the speech operation device 2 performed before the operation of the apparatus control device 1 illustrated in FIG. 5 will be described.

Figure 6:
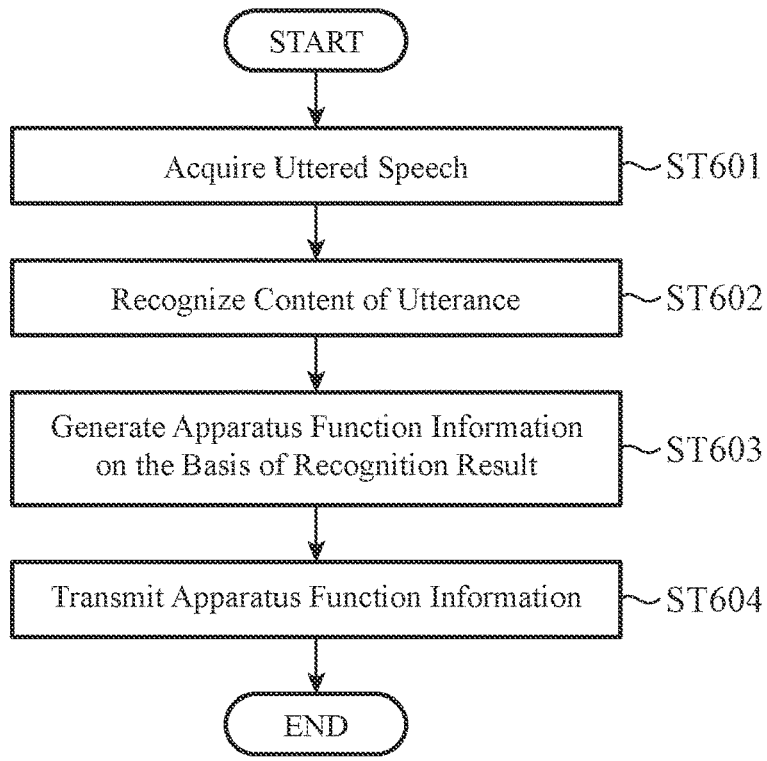
FIG. 6 is a flowchart for explaining exemplary operation of a speech operation device according to the first embodiment.

FIG. 6 is a flowchart for explaining exemplary operation of the speech operation device 2 according to the first embodiment.

Note that, in the following description, it is assumed that the apparatus function DB 25 stores apparatus information as illustrated in FIG. 2.

The speech acquiring unit 21 acquires uttered speech from the speech input device 4 (step ST601). Here, the speech acquiring unit 21 acquires the uttered speech of "use the microwave oven to heat up manually at 500 watts for two minutes".

The speech acquiring unit 21 outputs the acquired uttered speech to the speech recognition unit 22.

The speech recognition unit 22 collates the uttered speech acquired by the speech acquiring unit 21 in step ST601 with the speech recognition dictionary DB 24, and recognizes the content of the utterance (step ST602).

Here, for the uttered speech "use the microwave oven to heat up manually at 500 watts for two minutes", the speech recognition unit 22 recognizes the content of the utterance of "microwave", "manually", "500 watts", and the "two minutes".

The speech recognition unit 22 outputs the recognition result of the content of the utterance to the apparatus function determining unit 23.

The apparatus function determining unit 23 collates the recognition result of the content of the utterance output from the speech recognition unit 22 in step ST602 with the apparatus function DB 25, determines the target apparatus and one or more target functions, and generates apparatus function information (step ST603).

Here, the apparatus function determining unit 23 determines that the target apparatus is the "microwave". The apparatus function determining unit 23 further determines that the target functions are "manual mode", "500 watts", and "heating time of two minutes" of the "microwave".

Then, the apparatus function determining unit 23 generates apparatus function information in which the information of "microwave" is associated with the information of "manual mode", "at 500 watts", and "heating time of two minutes" (step ST603).

The apparatus function determining unit 23 transmits the apparatus function information generated in step ST603 to the apparatus control device 1 (step ST604).

As described above, the operation by the speech operation device 2 is performed before the operation of the apparatus control device 1 illustrated in FIG. 5.

Next, the operation of the apparatus control device 1 will be described with reference to FIG. 5.

Note that, in the following description, it is assumed that the procedure DB 14 stores procedure information as illustrated in FIG. 3.

The apparatus function information acquiring unit 11 acquires the apparatus function information (see step ST604 in FIG. 6) transmitted from the speech operation device 2 (step ST501).

The apparatus function information acquiring unit 11 outputs the acquired apparatus function information to the procedure determining unit 12.

The procedure determining unit 12 refers to the procedure DB 14 on the basis of the apparatus function information acquired by the apparatus function information acquiring unit 11 in step ST501, and determines one or more operations for executing one or more target functions and the order of the one or more operations (step ST502).

Here, the procedure determining unit 12 determines that operations are performed in the order of pressing the "microwave" button twice->pressing the "−(minus)" button once->pressing the "minute" button twice->pressing the "start" button once on the basis of the apparatus function information in which the information of the "microwave" and the information of the "manual mode", "500 watts" and "heating time of two minutes" are associated.

Then, the procedure determining unit 12 outputs, to the operation command transmission controlling unit 13, manual operation procedure information in which order information of "#1" is added to function-specific operation count information of pressing the "microwave" button twice, order information of "#2" is added to function-specific operation count information of pressing the "−(minus)" button once, order information of "#3" is added to function-specific operation count information of pressing the "minute" button twice, and order information of "#4" is added to function-specific operation count information of pressing the "start" button once.

The operation command transmission controlling unit 13 transmits an operation command at a first interval for each of the one or more operations to the target apparatus in accordance with the order of the one or more operations determined by the procedure determining unit 12 on the basis of the manual operation procedure information output from the procedure determining unit 12 in step ST502 (step ST503).

Here, the first interval is set to 0.2 seconds. The operation command transmission controlling unit 13 transmits, to the microwave oven at intervals of 0.2 seconds, an operation command including operation information indicating that the "microwave" button is pressed, an operation command including operation information indicating that the "microwave" button is pressed, an operation command including operation information indicating that the "− (minus)" button is pressed, an operation command including operation information indicating that the "minute" button is pressed, an operation command including operation information indicating that the "minute" button is pressed, and an operation command including operation information indicating that the "start" button is pressed in the order mentioned.

As described above, the apparatus control device 1 determines an operation procedure in a case where one or more target functions of the target apparatus are executed manually on the basis of the apparatus function information transmitted from the speech operation device 2. Then, according to the determined operation procedure, the apparatus control device 1 sequentially transmits, to the target apparatus, for each operation, an operation command at set intervals.

The household electrical appliance 3 that is the target apparatus (here, the microwave oven) executes each function on the basis of the operation command transmitted from the apparatus control device 1. Meanwhile, having received the operation command transmitted from the apparatus control device 1, the microwave oven sequentially outputs sound or displays information corresponding to the operation specified by the operation command each time the operation command is received.

Figure 7:
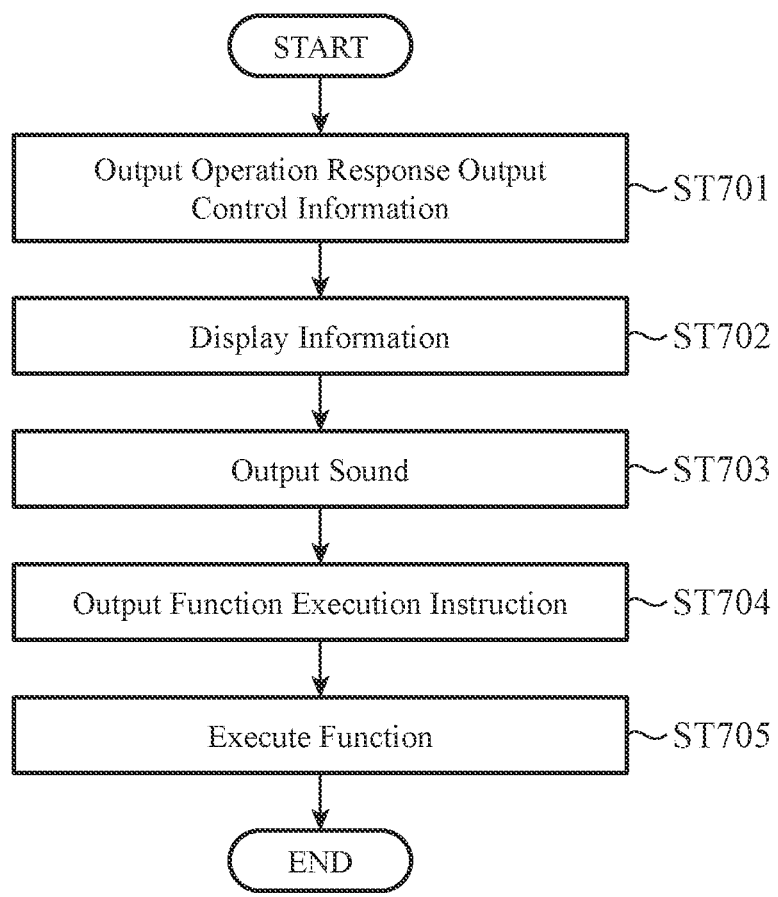
FIG. 7 is a flowchart for explaining exemplary operation of a household electrical appliance according to the first embodiment.

FIG. 7 is a flowchart for explaining exemplary operation of the household electrical appliance 3 according to the first embodiment.

With reference to FIG. 7, the operation of the microwave oven, which has received the operation commands transmitted from the apparatus control device 1 by the operation described in FIG. 6, for executing each function on the basis of the operation commands will be described.

Note that the microwave oven performs the operation illustrated in FIG. 7 each time an operation command is received from the apparatus control device 1.

When an operation command is transmitted from the operation command transmission controlling unit 13 of the apparatus control device 1 (see step ST502 in FIG. 6), the microwave oven acquires the transmitted operation command, and executes the operation described below each time an operation command is acquired.

The apparatus controlling unit 32 outputs operation response output control information to the output unit 34 on the basis of the operation command acquired from the operation command transmission controlling unit 13 (step ST701).

The display unit 341 of the output unit 34 displays information in accordance with the operation response output control information output from the apparatus controlling unit 32 in step ST701 (step ST702).

Furthermore, the sound output unit 342 of the output unit 34 outputs sound in accordance with the operation response output control information output from the apparatus controlling unit 32 in step ST701 (step ST703).

Note that although step ST703 is performed after step ST702 in FIG. 7, it is preferable that step ST702 and step ST703 be performed simultaneously.

The apparatus controlling unit 32 outputs a function execution instruction to the function executing unit 33 (step ST704).

The function executing unit 33 executes the function execution instruction output from the apparatus controlling unit 32 in step ST704 (step ST705).

Note that the function executing unit 33 executes a setting function when a function execution instruction of the setting function is output from the apparatus controlling unit 32.

In a case where a function execution instruction of the start function is output from the apparatus controlling unit 32, the function executing unit 33 starts the operation of the microwave oven on the basis of the executed setting function. Here, the function executing unit 33 starts the operation of the "heating function of 500 watts for two minutes in the manual mode".

Figure 8:
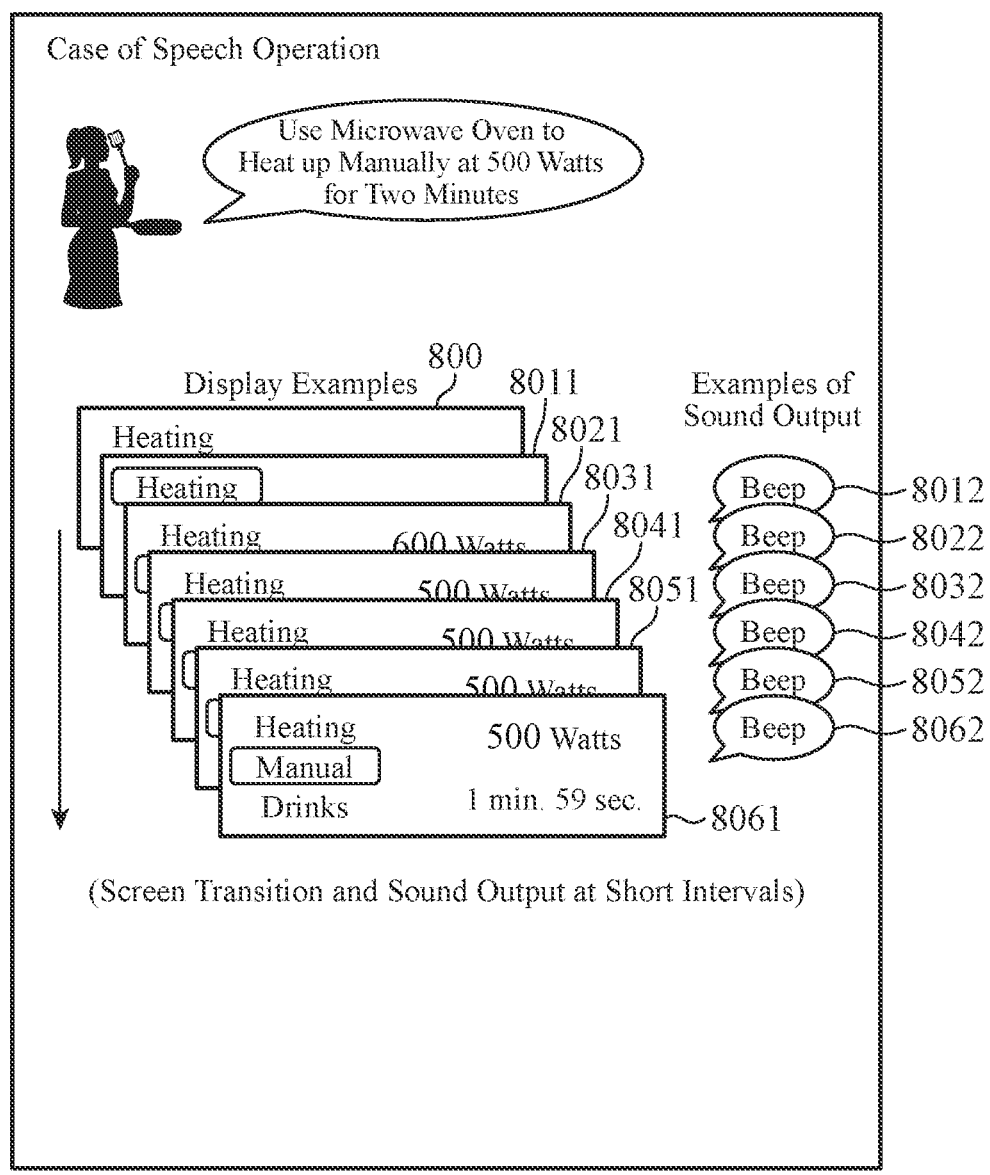
FIG. 8 is a diagram for explaining an example of display screens in which information is displayed by a display unit in accordance with operation response output control information as well as an example of sound output by a sound output unit in accordance with the operation response output control information in a case where a user causes a microwave oven to execute a heating function at 500 watts for two minutes in a manual mode by utterance in the first embodiment.

Here, FIG. 8 is a diagram for explaining an example of display screens in which information is displayed by the display unit 341 in accordance with operation response output control information (see step ST702) as well as an example of sound output by the sound output unit 342 in accordance with the operation response output control information (see step ST703) in the first embodiment. In FIG. 8, one example of display screens that are continuously displayed and sound that is continuously output in a case where the above-described operation of steps ST701 to ST705 are repeated until the function executing unit 33 starts operation are illustrated together.

Here, the operation command transmission controlling unit 13 sequentially transmits, at intervals of 0.2 seconds, an operation command including operation information indicating that the "microwave" button is pressed, an operation command including operation information indicating that the "microwave" button is pressed, an operation command including operation information indicating that the "− (minus)" button is pressed, an operation command including operation information indicating that the "minute" button is pressed, an operation command including operation information indicating that the "minute" button is pressed, and an operation command including operation information indicating that the "start" button is pressed.

For convenience of explanation, regarding operation response output control information that the apparatus controlling unit 32 sequentially outputs, to the display unit 341 and the sound output unit 342, after receiving the operation commands acquired in the above-described order, the operation response output control information corresponding to the operation command, including the operation information indicating that the "microwave" button is pressed, that is output first is referred to as the "first operation response".

The operation response output control information corresponding to the operation command including the operation information indicating that the "microwave" button is pressed, which is output secondly, is referred to as the "second operation response".

The operation response output control information corresponding to the operation command including the operation information indicating that the "− (minus)" button is pressed, which is output thirdly, is referred to as the "third operation response".

The operation response output control information corresponding to the operation command including the operation information indicating that the "minute" button is pressed, which is output fourthly, is referred to as the "fourth operation response".

The operation response output control information corresponding to the operation command including the operation information indicating that the "minute" button is pressed, which is output fifthly, is referred to as the "fifth operation response".

Then, the operation response output control information corresponding to the operation command including the operation information indicating that the "start" button is pressed, which is output lastly, is referred to as the "sixth operation response".

When the first operation response is transmitted from the state of an initial screen 800, the display unit 341 displays a screen indicating information that the "microwave" button has been pressed once in accordance with the first operation response (see 8011 in FIG. 8). Specifically, the display unit 341 displays a screen of a state in which the "heating" mode is selected. In this manner, the display unit 341 displays a screen corresponding to the operation information included in the operation response output control information. Note that the apparatus controlling unit 32 takes over the operation information included in the operation command and includes the operation information in operation response output control information when outputting the operation response output control information. The display unit 341 displays a screen based on operation information included in operation response output control information. Which information the display unit 341 displays depending on which operation information is determined in advance.

The sound output unit 342 outputs a short beep in accordance with the first operation response (see 8012 in FIG. 8).

When the second operation response is transmitted from the apparatus controlling unit 32 0.2 seconds later, the display unit 341 displays a screen indicating information that the "microwave" button has been further pressed once from the state of 8011 in FIG. 8 in accordance with the second operation response (see 8021 in FIG. 8). Specifically, the display unit 341 displays a screen of a state in which the "manual" mode is selected. At this point, the display unit 341 also displays information that the output power is "600 watts" and the heating time is "0 minutes 0 seconds" (see FIG. 9 described later). Note that the output power of "600 watts" and the heating time of "0 minutes 0 seconds" are initial values preset in the microwave oven. It is preset that the display unit 341 displays the initial value of output power and the initial value of heating time when the "manual" mode is selected.

The sound output unit 342 also outputs a short beep in accordance with the second operation response (see 8022 in FIG. 8).

When the third operation response is transmitted from the apparatus controlling unit 32 0.2 seconds later, the display unit 341 displays a screen indicating information that the "− (minus)" button has been pressed once from the state of 8021 in FIG. 8 in accordance with the third operation response (see 8031 in FIG. 8). Specifically, a screen indicating the information that the output power is "500 watts" is displayed. The sound output unit 342 also outputs a short beep in accordance with the third operation response (see 8032 in FIG. 8).

Here, the operation specified by the operation information of the third operation response (pressing the "− (minus)" button) is different from the operation specified by the operation information of the first operation response and the second operation response (pressing the "microwave" button)). Therefore, the sound output by the sound output unit 342 in accordance with the third operation response is different from the sound output by the sound output unit 342 in accordance with the first operation response and the second operation response. In the first embodiment, sound output by the sound output unit 342 being different means that, for example, the pitch is different.

In this manner, the sound output unit 342 outputs different types of sound depending on operation information included in operation response output control information.

When the fourth operation response is transmitted from the apparatus controlling unit 32 0.2 seconds later, the display unit 341 displays a screen indicating information that the "minute" button has been pressed once from the state of 8031 in FIG. 8 in accordance with the fourth operation response (see 8041 in FIG. 8). Specifically, a screen indicating information that the heating time is "1 minute 00 seconds" is displayed (see FIG. 9 described later). The sound output unit 342 also outputs a short beep in accordance with the fourth operation response (see 8042 in FIG. 8).

Here, the operation specified by the operation information of the fourth operation response (pressing the "minute" button) is different from the operation specified by the operation information of the first operation response and the second operation response (pressing the "microwave" button) and the operation information of the third operation response (pressing the "− (minus)" button). Therefore, the sound output by the sound output unit 342 in accordance with the fourth operation response is different from the sound output by the sound output unit 342 in accordance with the first operation response and the second operation response and the sound output in accordance with the third operation response.

When the fifth operation response is transmitted from the apparatus controlling unit 32 0.2 seconds later, the display unit 341 displays a screen indicating information that the "minute" button has been further pressed once from the state of 8041 in FIG. 8 in accordance with the fifth operation response (see 8051 in FIG. 8). Specifically, a screen indicating information that the heating time is "two minutes 00 seconds" is displayed (see FIG. 9 described later). The sound output unit 342 also outputs a short beep in accordance with the fifth operation response (see 8052 in FIG. 8).

Here, the operation specified by the operation information of the fifth operation response (pressing the "minute" button) is the same as the operation specified by the operation information of the fourth operation response. Therefore, the sound output by the sound output unit 342 in accordance with the fifth operation response is the same as the sound output by the sound output unit 342 in accordance with the third operation response.

When the sixth operation response is transmitted from the apparatus controlling unit 32 0.2 seconds later, the display unit 341 displays a screen indicating information that the "start" button has been pressed once from the state of 8051 in FIG. 8 in accordance with the sixth operation response (see 8061 in FIG. 8).

When the sixth operation response is transmitted, a function execution instruction for instructing the start function is output from the apparatus controlling unit 32 to the function executing unit 33, and the function executing unit 33 starts the operation of the target apparatus (step ST705 in FIG. 7). Therefore, the display unit 341 displays a screen indicating the operation status of the target apparatus. Specifically, the display unit 341 displays a screen indicating the operation status of the "heating function of 500 watts for two minutes in the manual mode". In 8061 in FIG. 8, it is understood that a state is displayed in which heating is started from the state in which the heating time is set to 2 minutes 00 seconds (see 8051 in FIG. 8) and the remaining heating time is decreased.

The sound output unit 342 outputs a short beep in accordance with the sixth operation response (see 8062 in FIG. 8). The sound output by the sound output unit 342 in accordance with the sixth operation response is different from the sound output by the sound output unit 342 in accordance with the first to fifth operation responses.

Figure 9:
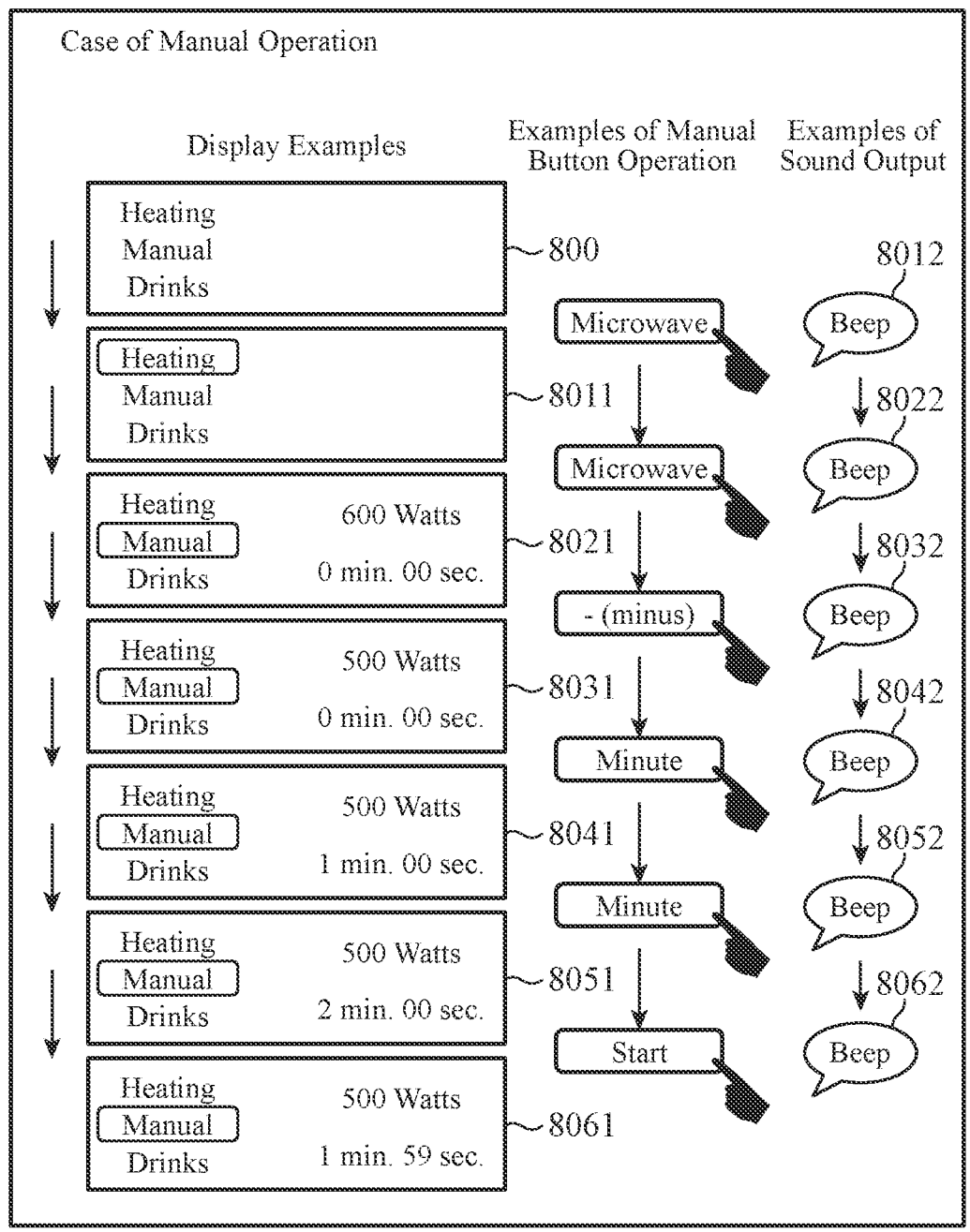
FIG. 9 is a diagram for explaining an example of screens displayed by the display unit and sound output by the sound output unit depending on the operation performed until execution of the heating function in a case where the user causes the microwave oven to execute the heating function at 500 watts for two minutes by manual operation in the manual mode in the first embodiment.

FIG. 9 is a diagram for explaining an example of screens displayed by the display unit 341 and sound output by the sound output unit 342 depending on the operation performed by execution of the heating function in a case where the user causes the microwave oven to execute the heating function at 500 watts for two minutes by manual operation in the manual mode in the first embodiment.

In this case, the flow of operations actually performed by the user is as follows: pressing the "microwave" button once->pressing the "microwave" button once->pressing the "− (minus)" button once->pressing the "minute" button once->pressing the "minute" button once->pressing the "start" button once.

For convenience of explanation, an operation in which a user first presses the "microwave" button once is referred to as a "first operation". An operation in which the user presses the "microwave" button for the second time is referred to as a "second operation". Then an operation in which the user presses the "− (minus)" button once is referred to as a "third operation". Next, an operation in which the user presses the "minute" button once is referred to as a "fourth operation".

An operation in which the user presses the "minute" button for the second time is referred to as a "fifth operation". Finally, an operation in which the user presses the "start" button once is referred to as a "sixth operation".

When the user performs the first to sixth operations, the manual operation accepting unit 31 sequentially accepts the performed operations, and the apparatus controlling unit 32 outputs operation response output control information corresponding to the first to sixth operations each time to the display unit 341 and the sound output unit 342.

The display unit 341 sequentially displays screens as illustrated in 8011 to 8061 in FIG. 9 in accordance with the operation response output control information output from the apparatus controlling unit 32.

Meanwhile, the sound output unit 342 sequentially outputs sound as illustrated in 8012 to 8062 in FIG. 9 in accordance with the operation response output control information output from the apparatus controlling unit 32.

The screens indicated by 8011 to 8061 in FIG. 9 are the same as the screens indicated by 8011 to 8061 in FIG. 8 described above, respectively.

Likewise, the sound 8012 to 8062 in FIG. 9 are the same as the sound 8012 to 8062 in FIG. 8, respectively.

As described above, in the apparatus control system 100 according to the first embodiment, the apparatus control device 1 can display screens and output sound as if the user is operating the household electrical appliance 3 by manual operation when the user performs speech operation on the household electrical appliance 3.

In the related art, for example, in a case where a user wants to operate a microwave oven at 500 watts for two minutes, when the user utters "heat up at 500 watts for two minutes", the microwave oven outputs response sound of a beep, and the heating operation is executed at 500 watts for two minutes.

As described above, in the related art, the microwave oven only outputs response sound of a single beep for one or more operations performed to execute the function instructed by the user by the utterance.

Therefore, the user cannot know whether or not functions each corresponding to the operations intended by the user are executed in the microwave oven.

For example, the number of operations performed for setting the output power and settings the heating time is different for the case where the user intends to cause the microwave oven to perform heating operation at 500 watts for two minutes and the case where the user intends to cause the microwave oven to perform heating operation at 700 watts for eight minutes if the user wants to manually execute the functions. However, when the user executes the functions by uttered speech, the microwave oven outputs the same response sound of a beep in both cases of uttering "heat up at 500 watts for two minutes" and uttering "heat up at 700 watts for eight minutes". As a result, the user cannot know the difference whether or not an operation for heating for two minutes at 500 watts has been actually performed or an operation for heating for eight minutes at 700 watts has been actually performed on the microwave oven. In addition, since the functions are executed instantaneously in the microwave oven, the user cannot know what has happened in the microwave oven.

As described above, in the related art, it is not possible to confirm that, when a user instructs, by a single time of utterance, execution of one or more functions that require multiple manual operations in a case of manual operation, the functions corresponding to the respective multiple manual operations have been executed in the household electrical appliance 3.

Contrarily, the apparatus control device 1 according to the first embodiment allows the user to confirm that the functions corresponding to the respective multiple manual operations have been executed in the household electrical appliance 3, when a user instructs, by a single time of utterance, execution of one or more functions that require multiple manual operations in a case of manual operation.

In addition, the user can have a feeling as if another person has operated in place of the user, when the user operates the household electrical appliance 3 by speech operation, due to screen display and sound output performed as if the household electrical appliance 3 is being operated by manual operation.

In addition, for example, even if the user is in a place away from the place where the household electrical appliance 3 is installed and the display unit 341 of the household electrical appliance 3 cannot be confirmed, the user can confirm the sound that is output in response to the uttered speech as many times as the number of operations if the buttons are operated. As a result, the user can confirm that the operation as imagined has been performed from a comparison between the number of operations if in a case of manual operation and the number of times of sound output, or the pitch of the output sound.

Furthermore, as described above, the content of the operation commands output from the manual operation accepting unit 31 to the apparatus controlling unit 32 and the content of the operation commands transmitted from the operation command transmission controlling unit 13 to the apparatus controlling unit 32 are the same in the household electrical appliance 3. Therefore, only by providing a function that enables reception of operation commands from the apparatus control device 1 outside the household electrical appliance 3, it is possible to make the household electrical appliance 3 compatible with the above-described control of executing the functions of the household electrical appliance 3 based on uttered speech of the user. That is, it is possible to make the existing household electrical appliance 3 to be compatible with the speech operation function with a simple work without additional cost.

Moreover, the user confirms screens and sound at short intervals that are output for the same number of times as in the case of operating the buttons of the household electrical appliance 3 manually. As a result, the user can feel that operations are performed at short intervals at high speed as compared to a case where the user manually operates the buttons of the household electrical appliance 3, and thus can feel the convenience of being able to perform the operation control of the household electrical appliance 3 by shortcutting using uttered speech.

In the above description, in the apparatus control device 1, the operation command transmission controlling unit 13 transmits operation commands to the target apparatus at the same first intervals (for example, an interval of 0.2 seconds) regardless of the content of an operation specified by operation information.

However, this is merely an example, and the operation command transmission controlling unit 13 can change the intervals at which operation commands are transmitted depending on the content of an operation specified by operation information. Specifically, the operation command transmission controlling unit 13 can transmit the operation commands, for example, at an interval shorter than the first interval (for example, a second interval) while operation commands of the same operation that is specified by operation information are transmitted.

Hereinafter, description will be given with a specific example.

Note that, as in the example described when operations have been explained with reference to FIGS. 5 to 9, it is assumed also in the following description that the user utters "use the microwave oven to heat up manually at 500 watts for two minutes" and causes the microwave oven to execute the heating function of 500 watts for two minutes in the manual mode.

In the specific example described below, it is set that operation commands are transmitted at the first interval as the normal interval as in the example in which operations are described with reference to FIGS. 5 to 9; however, during transmission of operation commands of the same operation that is specified by operation commands, the operation commands are transmitted at a second interval that is shorter than the first interval.

In the apparatus control device 1, the operation command transmission controlling unit 13 changes transmission intervals of operation commands when transmitting, to the microwave oven, an operation command including operation information indicating that the "microwave" button is pressed, an operation command including operation information indicating that the "microwave" button is pressed, an operation command including operation information indicating that the "– (minus)" button is pressed, an operation command including operation information indicating that the "minute" button is pressed, an operation command including operation information indicating that the "minute" button is pressed, and an operation command including operation information indicating that the "start" button is pressed in the order mentioned.

For convenience of explanation, hereinafter, an operation command including operation information indicating that the "microwave" button is pressed is referred to as a first operation command, an operation command including operation information indicating that the "– (minus)" button is pressed is referred to as a second operation command, an operation command including operation information indicating that the "minute" button is pressed is referred to as a third operation command, and an operation command including operation information indicating that the "start" button is pressed is referred to as a fourth operation command. The operation command transmission controlling unit 13 transmits operation commands to the microwave oven in the order of the first operation command->the first operation command->the second operation command->the third operation command->the third operation command->the fourth operation command.

Here, the operation command transmission controlling unit 13 transmits the first operation commands at the second interval (for example, 0.1 seconds) during transmission of the first operation commands. Then, when transmitting the second operation command, the operation command transmission controlling unit 13 determines that the transmitted operation command is no longer the same since the operation specified by the operation information is different from that of the first operation commands that have been transmitted previously, and transmits the second operation command after the first interval, which is the normal interval.

Next, the operation command transmission controlling unit 13 transmits the third operation command, and the operation specified by the operation information of the third operation command is different from the operation specified by the operation information of the second operation command. Therefore, the operation command transmission controlling unit 13 transmits the third operation command after the first interval.

The operation command transmission controlling unit 13 further transmits the third operation command. Since the third operation commands are transmitted successively, the operation command transmission controlling unit 13 transmits the third operation command after the second interval.

Lastly, the operation command transmission controlling unit 13 transmits the fourth operation command. In this case, the operation command transmission controlling unit 13 transmits the fourth operation command after the first interval.

The operation command transmission controlling unit 13 sets the transmission interval (second interval) for transmission of an operation command including the same operation information as that of the operation command transmitted immediately before to be shorter than the interval (first interval) set as the normal interval.

FIG. 10 is a diagram illustrating a concept of each operation command transmitted at different intervals depending on an operation indicated by operation information included in the operation command in the first embodiment.

In FIG. 10, a concept is illustrated as an example in which the above-described first to fourth operation commands are transmitted.

In FIG. 10, the first interval is 0.2 seconds, and the second interval is 0.1 seconds.

In this manner, the operation command transmission controlling unit 13 can change the intervals at which operation commands are transmitted depending on the content of an operation specified by operation information. Specifically, the operation command transmission controlling unit 13 transmits operation commands at shorter intervals when operation commands of the same operation that is specified by operation information are transmitted successively than in the case of successive transmission of operation commands of which operations specified by operation information are different.

As a result, in the target apparatus (microwave oven in the above example), the interval at which the apparatus controlling unit 32 receives operation commands changes, and the output interval of operation response output control information that the apparatus controlling unit 32 outputs to the output unit 34 also changes. Specifically, the output interval of operation response output control information that is output from the apparatus controlling unit 32 to the output unit 34 changes in a similar manner to the way how the transmission interval at which the operation command transmission controlling unit 13 transmits operation commands to a target apparatus changes.

Accordingly, in the target apparatus, the interval at which screens displayed by the display unit 341 are switched and the interval at which the sound output unit 342 outputs sound change.

In the target apparatus, while the same operation commands are transmitted, the interval at which screens displayed by the display unit 341 are switched and the interval at which the sound output unit 342 outputs sound are shorter than usual, and thus the display unit 341 performs display as if the display is grouped, and the sound output unit 342 outputs sound as if the sound is grouped.

Figure 11:
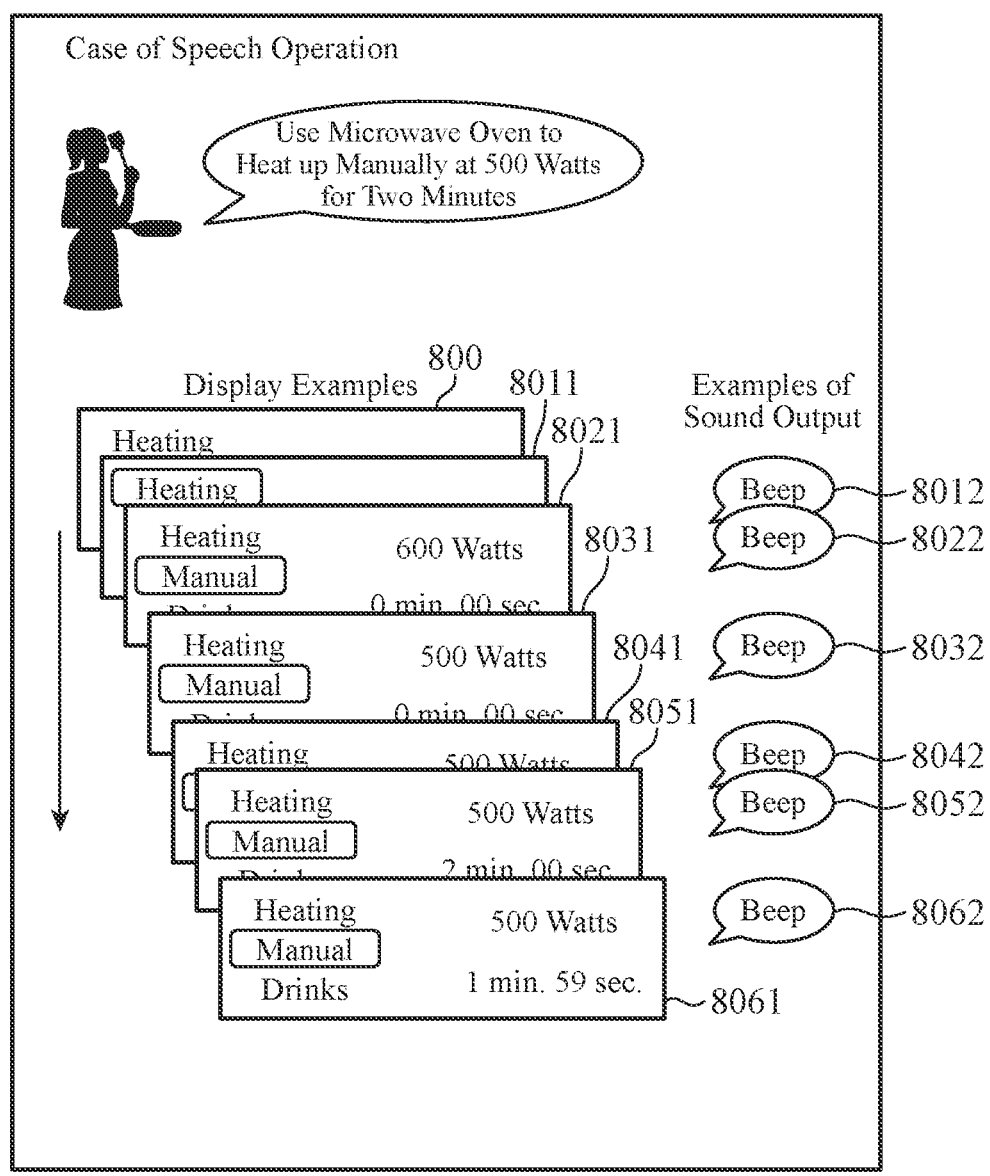
FIG. 11 is a diagram for explaining an example of display screens in which information is displayed by the display unit in accordance with operation response output control information as well as an example of sound output by the sound output unit in accordance with the operation response output control information in a case where output intervals of the operation response output control information change in the first embodiment.

FIG. 11 is a diagram for explaining an example of display screens in which information is displayed by the display unit 341 in accordance with operation response output control information as well as an example of sound output by the sound output unit 342 in accordance with the operation response output control information in a case where output intervals of the operation response output control information change in the first embodiment.

Incidentally, FIG. 11 is a diagram illustrating an example of display screens displayed by the display unit 341 and an example of sound output by the sound output unit 342 in the above-described example in a case where operation responses are output from the apparatus controlling unit 32 to the microwave oven at output intervals as illustrated in FIG. 10.

In the concept of display screens and the concept of sound illustrated in FIG. 8, the intervals at which the display screens 8011 to 8061 are displayed and the intervals at which the sound 8012 to 8062 are output are constant.

On the other hand, in this example, since the output interval of the operation response output control information changes, as illustrated in FIG. 11, for example, the interval from display of the display screen illustrated by 8021 to display of the display screen illustrated by 8031 (first interval) is longer than the interval from display of the display screen illustrated by 8011 to display of the display screen illustrated by 8021 (second interval).

Likewise, the interval from display of the display screen illustrated by 8041 to display of the display screen illustrated by 8051 (second interval) is shorter than the interval from display of the display screen illustrated by 8031 to display of the display screen illustrated by 8041 (first interval).

Moreover, as illustrated in FIG. 11, for example, the interval from output of the sound illustrated by 8012 to output of the sound illustrated by 8022 is shorter than the interval from output of the sound illustrated by 8022 to output of the sound illustrated by 8032. The sounds indicated by 8012 and 8022 are different from the sound indicated by 8032.

As described above, in the apparatus control device 1, with the operation command transmission controlling unit 13 changing the interval at which operation commands are transmitted depending on an operation specified by operation information, the user can distinguish between a case where the same operations are performed successively and a case where mutually different operations are performed successively when the user instructs, by a single time of utterance, execution of one or more functions that require multiple manual operations in a case of manual operation, and thus the user can more reliably confirm execution of the functions in the household electrical appliance 3. The user can also intuitively feel the difference between the functions to be executed.

Figure 12A:
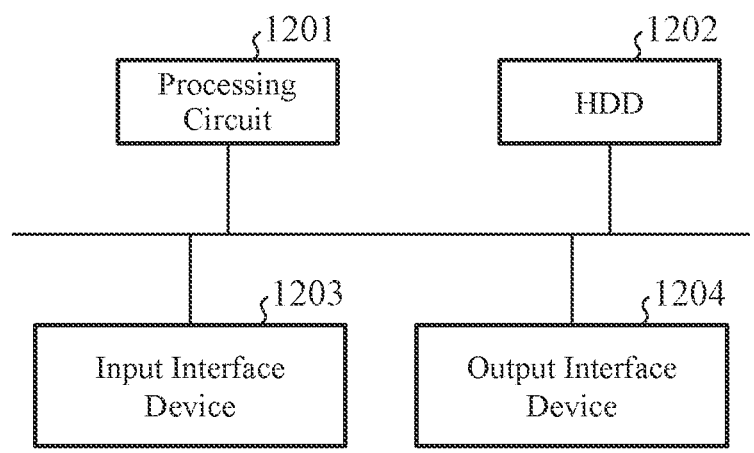
FIGS. 12A and 12B are diagrams each illustrating an exemplary hardware configuration of the apparatus control device according to the first embodiment.
Figure 12B:
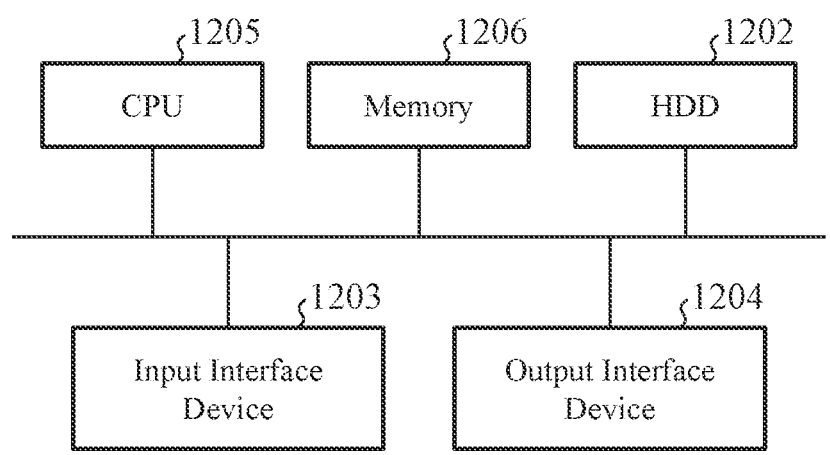

FIGS. 12A and 12B are diagrams each illustrating an exemplary hardware configuration of the apparatus control device 1 according to the first embodiment.

In the first embodiment, the functions of the apparatus function information acquiring unit 11, the procedure determining unit 12, and the operation command transmission controlling unit 13 are implemented by a processing circuit 1201. That is, the apparatus control device 1 includes the processing circuit 1201 for performing control for transmitting an operation command for causing the household electrical appliance 3 to output operation response output control information corresponding to each of one or more operations on the basis of apparatus function information.

The processing circuit 1201 may be dedicated hardware as illustrated in FIG. 12A or may be a central processing unit (CPU) 1205 for executing a program stored in a memory 1206 as illustrated in FIG. 12B.

In a case where the processing circuit 1201 is dedicated hardware, the processing circuit 1201 corresponds to, for example, a single circuit, a composite circuit, a programmed processor, a parallel programmed processor, an application specific integrated circuit (ASIC), a field-programmable gate array (FPGA), or a combination thereof.

In a case where the processing circuit 1201 is the CPU 1205, the functions of the apparatus function information acquiring unit 11, the procedure determining unit 12, and the operation command transmission controlling unit 13 are implemented by software, firmware, or a combination of software and firmware. That is, the apparatus function information acquiring unit 11, the procedure determining unit 12, and the operation command transmission controlling unit 13 are implemented by the CPU 1205 or a processing circuit such as a system large-scale integration (LSI) that executes programs stored in a hard disk drive (HDD) 1202, the memory 1206, or the like. In addition, it can be said that the program stored in the HDD 1202, the memory 1206, or the like causes the computer to execute the procedures and methods of the apparatus function information acquiring unit 11, the procedure determining unit 12, and the operation command transmission controlling unit 13. Here, the memory 1206 may be a nonvolatile or volatile semiconductor memory such as a random access memory (RAM), a read only memory (ROM), a flash memory, an erasable programmable read only memory (EPROM), or an electrically erasable programmable read only memory (EEPROM); a magnetic disc, a flexible disc, an optical disc, a compact disc, a mini disc, a digital versatile disc (DVD), or the like.

Note that a part of the functions of the apparatus function information acquiring unit 11, the procedure determining unit 12, and the operation command transmission controlling unit 13 may be implemented by dedicated hardware and another part thereof may be implemented by software or firmware. For example, the function of the apparatus function information acquiring unit 11 may be implemented by the processing circuit 1201 as dedicated hardware, and the functions of the procedure determining unit 12 and the operation command transmission controlling unit 13 may be implemented by the processing circuit reading and executing a program stored in the memory 1206.

For the procedure DB 14, the memory 1206 is used. Note that this is an example, and the procedure DB 14 may be implemented by the HDD 1202, a solid state drive (SSD), a DVD, or the like.

The apparatus control device 1 further includes an input interface device 1203 and an output interface device 1204 that communicate with the household electrical appliance 3 or the like.

The household electrical appliance 3 according to the first embodiment also has a hardware configuration as exemplified in FIGS. 12A and 12B.

The manual operation accepting unit 31, the apparatus controlling unit 32, and the function executing unit 33 have a similar hardware configuration to that of the apparatus function information acquiring unit 11 and the like in the apparatus control device 1.

The household electrical appliance 3 further includes a display device (not illustrated in FIG. 12) and a speech output device (not illustrated in FIG. 12).

The display unit 341 corresponds to the display device, and the sound output unit 342 corresponds to the speech output device.

The speech operation device 2 according to the first embodiment also has a hardware configuration as exemplified in FIGS. 12A and 12B.

The speech acquiring unit 21, the speech recognition unit 22, and the apparatus function determining unit 23 have a similar hardware configuration to that of the apparatus function information acquiring unit 11 and the like in the apparatus control device 1.

For the speech recognition dictionary DB 24 and the apparatus function DB 25, the memory 1206 is used. Note that this is an example, and the speech recognition dictionary DB 24 and the apparatus function DB 25 may be implemented by the HDD 1202, a solid state drive (SSD), a DVD, or the like.

As described above, according to the first embodiment, the apparatus control device 1 includes: the apparatus function information acquiring unit 11 for acquiring apparatus function information in which a target apparatus and one or more target functions to be executed by the target apparatus, which are determined on the basis of the uttered speech, are associated with each other; the procedure determining unit 12 for determining one or more manual operations for executing the one or more target functions and an order of the one or more manual operations on the basis of the apparatus function information acquired by the apparatus function information acquiring unit 11; and the operation command transmission controlling unit 13 for sequentially transmitting, to the target apparatus, operation commands for outputting operation response output control information corresponding to each of the one or more manual operations for each of the one or more manual operations in accordance with the order of the one or more manual operations determined by the procedure determining unit 12. Therefore, it is possible for the user to confirm that, when execution of one or more functions that require multiple manual operations in a case of manual operation is instructed by a single time of utterance, the functions corresponding to the respective multiple manual operations have been executed in the household electrical appliance 3.

In addition, in a case where the one or more manual operations include multiple manual operations having mutually the same content and multiple manual operations having mutually different contents, in the apparatus control device 1, the operation command transmission controlling unit 13 can set mutually different transmission intervals for the transmission interval of operation commands at which the operation commands corresponding to the multiple manual operations having mutually the same content are transmitted successively and the transmission interval of operation commands at which the operation commands corresponding to the multiple manual operations having the mutually different content are transmitted successively. For this reason, the user can distinguish between a case where the same operations are performed successively and a case where mutually different operations are performed successively when the user instructs, by a single time of utterance, execution of one or more functions that require multiple manual operations in a case of manual operation, and thus the user can more reliably confirm execution of the functions in the household electrical appliance 3. The user can also intuitively feel the difference between the functions to be executed.

Second Embodiment

In the first embodiment, the procedure determining unit 12 determines one or more operations for executing one or more target functions by referring to the procedure DB 14 on the basis of apparatus function information in the apparatus control device 1. That is, the procedure determining unit 12 determines the number of operations required for execution of the functions based on the apparatus function information from the initial value predetermined for each of the functions.

In a second embodiment, description will be given on an embodiment in which a procedure determining unit 12 determines the number of operations required for execution of a function based on apparatus function information in consideration of the current status of a household electrical appliance 3.

Figure 13:
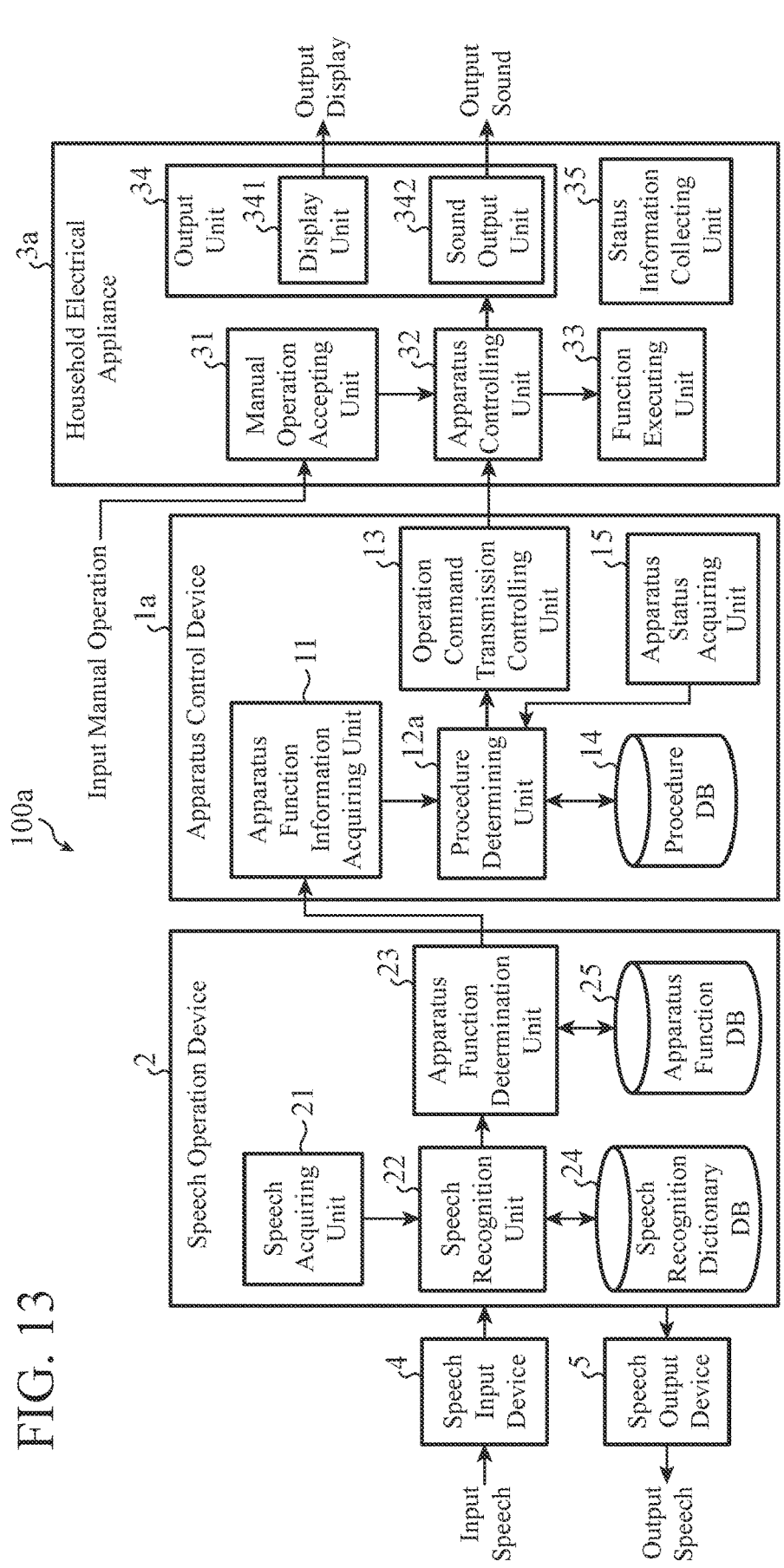
FIG. 13 is a diagram for explaining an exemplary configuration of an apparatus control system including an apparatus control device according to a second embodiment.

FIG. 13 is a diagram for explaining an exemplary configuration of an apparatus control system 100a including an apparatus control device 1a according to the second embodiment.

The configuration of the apparatus control system 100a is similar to the configuration of the apparatus control system 100 described in the first embodiment with reference to FIG. 1.

In the second embodiment, the configurations of the apparatus control device 1a and a household electrical appliance 3a included in the apparatus control system 100a are different from the configurations of the apparatus control device 1 and the household electrical appliance 3 included in the apparatus control system 100 of the first embodiment.

Hereinafter, regarding the apparatus control device 1a and the household electrical appliance 3a, only configurations different from those of the apparatus control device 1 and the household electrical appliance 3 of the first embodiment will be described, and a similar configuration to that of the apparatus control device 1 and the household electrical appliance 3 of the first embodiment will be denoted by the same symbol, and its redundant description is omitted.

Note that the hardware configurations of the apparatus control device 1a and the household electrical appliance 3a are similar to the hardware configurations of the apparatus control device 1 and the household electrical appliance 3 according to the first embodiment, and thus its redundant description will be omitted. An apparatus status acquiring unit 15 (described later) of the apparatus control device 1a has a similar hardware configuration to that of an apparatus function information acquiring unit 11. A status information collecting unit 35 (described later) of the household electrical appliance 3a has a similar hardware configuration to that of an apparatus controlling unit 32.

The apparatus control device 1a includes the apparatus status acquiring unit 15.

The apparatus status acquiring unit 15 acquires information of the current status of the household electrical appliance 3a from the household electrical appliance 3a. In the second embodiment, the information of the status of the household electrical appliance 3a refers to the setting status of the household electrical appliance 3a after execution of the setting function, or the status of the household electrical appliance 3a in operation after execution of the start function. Specifically, for example, in a case where the household electrical appliance 3a is an IH cooking heater that is performing a heating operation, the setting information of the current heating power is information of the status of the IH cooking heater. Alternatively, for example, in a case where the household electrical appliance 3 is an air conditioner that is performing a cooling operation, the setting information indicating the cooling mode is information of the status of the air conditioner.

Hereinafter, information of the current status of the household electrical appliance 3a is referred to as "apparatus status information".

In the second embodiment, the procedure determining unit 12a refers to the procedure DB 14 and determines one or more operations for executing one or more target functions and the order of the one or more operations on the basis of the apparatus function information acquired from the speech operation device 2 and the apparatus status information acquired by the apparatus status acquiring unit 15.

For example, let us assume that a user utters "increase the heating power of the right stove to heating power 5" in order to increase the heating power to heating power 5 in the right stove of the IH cooking heater currently performing the heating operation at heating power 3.

In this case, the speech operation device 2 transmits apparatus function information in which the information of the target apparatus "IH cooking heater" is associated with the information of the target functions "right stove" and "heating power 5". The specific operation of the speech operation device 2 has already been explained in the first embodiment, and thus its redundant description is omitted.

The procedure determining unit 12a acquires the apparatus function information described above.

The procedure determining unit 12a further acquires, via the apparatus status acquiring unit 15, apparatus status information indicating that the current heating power is heating power 3 from the IH cooking heater.

On the basis of the apparatus function information and the apparatus status information, the procedure determining unit 12a determines, regarding target functions of the target apparatus, execution of which functions actually results in execution of target functions that are instructed by apparatus function information. In the above example, the current heating power of the IH cooking heater based on the apparatus status information is heating power 3, and the target function based on the apparatus function information is heating power 5. In this case, the procedure determining unit 12a can determine on the basis of the difference between heating power 3 and heating power 5 that increasing the heating power by 2 from the current heating power results in execution of the target function indicated by the apparatus function information. Therefore, the procedure determining unit 12a determines that the functions to be actually executed are the "right stove" and "by heating power 2" for the "IH cooking heater".

Then, the procedure determining unit 12a refers to the procedure DB 14 on the basis of the functions determined to be actually executed, and determines operations and the order of the operations in the case where the manual operation of increasing the heating power of the "right stove" by "heating power 2" is performed on the "IH cooking heater".

The specific operation for the procedure determining unit 12a to determine operations and the order of the operations by referring to the procedure DB 14 is similar to the specific operation of the procedure determining unit 12 described in the first embodiment, and thus its redundant explanation will be omitted.

In a case where the start function is not defined in the procedure DB 14, the procedure determining unit 12a determines that the operation is performed in the order of turning on the "rotary encoder of the right stove"->turning the "rotary encoder" to positive twice. The procedure determining unit 12a outputs, to an operation command transmission controlling unit 13, manual operation procedure information in which order information of "#1" is added to function-specific operation count information of turning on the "rotary encoder of the right stove", and order information of "#2" is added to function-specific operation count information of turning the "rotary encoder" to positive four times. Note that it is assumed that the procedure DB 14 stores the procedure information as described with reference to FIG. 3 in the first embodiment. However, in this case, "start" is not defined as a function corresponding to the "IH cooking heater" in the procedure information illustrated in FIG. 3.

Alternatively, in a case where the start function is defined in the procedure DB 14, the procedure determining unit 12a determines that the operation is performed in the order of turning on the "rotary encoder of the right stove"->turning the "rotary encoder" to positive twice->pressing the "start" button once. Then, the procedure determining unit 12a outputs, to the operation command transmission controlling unit 13, manual operation procedure information in which order information of "#1" is added to function-specific operation count information of turning on the "rotary encoder of the right stove", order information of "#2" is added to function-specific operation count information of turning the "rotary encoder" to positive four times, and order information of "#3" is added to function-specific operation count information of pressing the "start" button once. Note that it is assumed that the procedure DB 14 stores the procedure information as described with reference to FIG. 3 in the first embodiment.

As another example, for example, let us assume that a user utters "set the air conditioner to 23° C." in order to lower the preset temperature of the air conditioner currently operating at a preset temperature of 25° C.

In this case, the speech operation device 2 transmits apparatus function information in which the information of the target apparatus "air conditioner" is associated with the information of the target function "23° C.". The specific operation of the speech operation device 2 has already been explained in the first embodiment, and thus its redundant description is omitted. Note that, in the apparatus information described in FIG. 2 in the first embodiment, description of information of an apparatus and functions corresponding to the air conditioner is omitted.

The procedure determining unit 12a acquires the apparatus function information described above.

The procedure determining unit 12a further acquires, from the air conditioner, apparatus status information indicating that the preset temperature is 25° C.

The procedure determining unit 12a determines that the current preset temperature of the air conditioner based on the apparatus status information is 25° C. and that the target function based on the apparatus function information is 23° C. In this case, on the basis of the difference between 25° C. and 23° C., the procedure determining unit 12a can determine that lowering the preset temperature by 2° C. from the current preset temperature results in execution of the target function based on the apparatus function information. Therefore, the procedure determining unit 12a determines that the function to be actually executed is "−2° C." of the "air conditioner".

Next, on the basis of the function determined to be actually executed, the procedure determining unit 12a refers to the procedure DB 14 and determines operations and the order of the operations in the case where the manual operation of "−2° C." is performed on the "air conditioner".

Although not described in the procedure information explained with reference to FIG. 3 in the first embodiment, the procedure determining unit 12a refers to the procedure DB 14 and determines the operation of pressing "the minus temperature setting button twice". Then, the procedure determining unit 12a outputs, to the operation command transmission controlling unit 13, manual operation procedure information in which order information of "#1" is added to the function-specific operation count information of pressing "the minus temperature setting button twice".

Let us return to the explanation of FIG. 13.

The household electrical appliance 3a includes the status information collecting unit 35.

The status information collecting unit 35 collects apparatus status information.

The status information collecting unit 35 transmits the collected apparatus status information to the apparatus control device 1a.

Note that the status information collecting unit 35 is only required to collect apparatus status information regarding, for example, the current status of the household electrical appliance 3 at all times and to transmit the collected apparatus status information to the apparatus control device 1a. Alternatively, for example, the apparatus status acquiring unit 15 of the apparatus control device 1a may transmit an apparatus status information request to the status information collecting unit 35, and the status information collecting unit 35 may collect the apparatus status information requested by the apparatus status information request and reply to the apparatus status acquiring unit 15 when receiving the apparatus status information request.

Figure 14A:
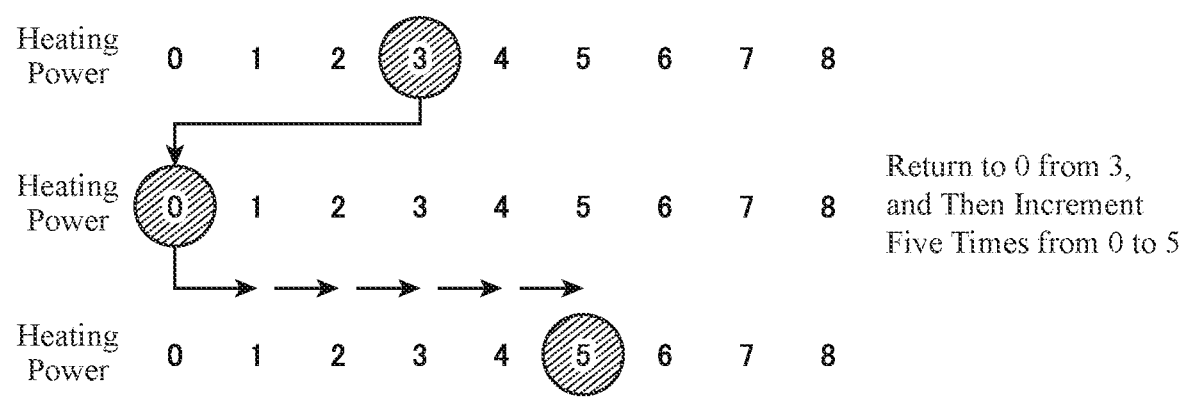
FIG. 14A is a diagram illustrating a concept of the operation when the heating power of the IH cooking heater is changed from heating power 3 to heating power 5 in the first embodiment.
Figure 14B:
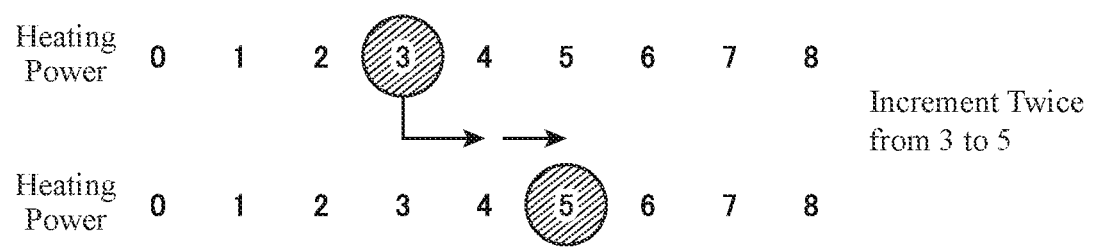
FIG. 14B is a diagram illustrating a concept of the operation when the heating power of the IH cooking heater is changed from heating power 3 to heating power 5 in the second embodiment.

Here, FIG. 14 is a diagram for explaining a concept of a difference between the operation of the apparatus control device 1 in the first embodiment and the operation of the apparatus control device 1a in the second embodiment for example in a case where the heating power is changed from heating power 3 to heating power 5 in an IH cooking heater. FIG. 14A is a diagram illustrating a concept of the operation of the apparatus control device 1a when the heating power of the IH cooking heater is changed from heating power 3 to heating power 5 in the first embodiment, and FIG. 14B is a diagram illustrating a concept of the operation of the apparatus control device 1a when the heating power of the IH cooking heater is changed from heating power 3 to heating power 5 in the second embodiment In the first embodiment, the procedure determining unit 12 refers to the procedure DB 14 and determines the number of operations always counted from the initial value. For example, in the above-described example, in the first embodiment, the procedure determining unit 12 determines an operation of turning the rotary encoder to positive five times from heating power 0. In the IH cooking heater, the functions of temporarily returning the right rotary encoder from the current heating power 3 to heating power 0 and increasing the heating power from heating power 0 to heating power 5 are executed (see FIG. 14A).

Meanwhile, in the second embodiment, the procedure determining unit 12a acquires apparatus status information and determines, in consideration of the current status of the target apparatus, execution of which functions actually results in execution of target functions based on apparatus function information. As a result, in the above example, the procedure determining unit 12a determines the operation of turning the rotary encoder to positive twice from the current heating power. In the IH cooking heater, the function of increasing the heating power by 2 from the current heating power 3 of the right rotary encoder is executed (see FIG. 14B).

As a result, the apparatus control device 1a can perform the above-described determination operation and the process of transmitting operation commands to the target apparatus by the operation command transmission controlling unit 13 with a small number of procedures in a short time.

This also allows a user to execute a target function by uttered speech instructing, to a target apparatus, a difference from the current status of the target apparatus, such as "XX a little" or "YY by XX".

For example, the user can execute the operation of increasing the heating power of a stove of the IH cooking heater from the current heating power by set heating power or the control of reducing the heating power of a stove of the IH cooking heater by one level from the current heating power by uttered speech to the IH cooking heater such as "increase the heating power a little" or "decrease the heating power by one level".

In addition, for example, the user can cause the air conditioner to execute the control of raising the preset temperature of the air conditioner from the current preset temperature by a set temperature by uttered speech such as "slightly reduce the power".

The operations of the apparatus control device 1a and the household electrical appliance 3a in the apparatus control system 100a according to the second embodiment will be described.

Figure 15:
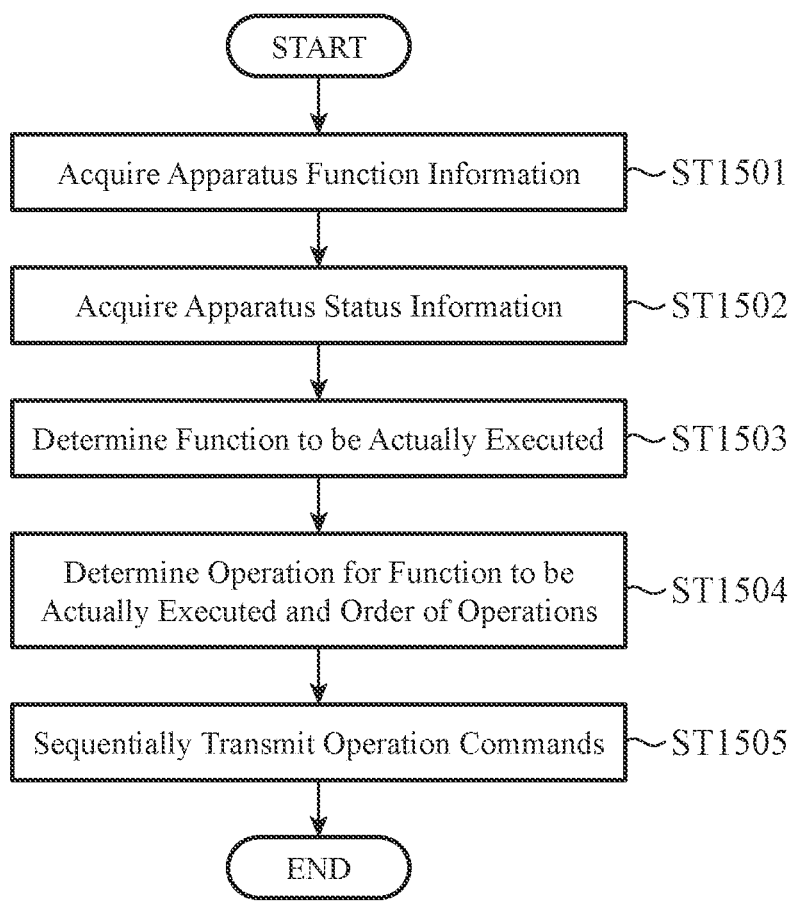
FIG. 15 is a flowchart for explaining the operation of the apparatus control device according to the second embodiment.

FIG. 15 is a flowchart for explaining the operation of the apparatus control device 1a according to the second embodiment.

The specific operations of step ST1501 and step ST1505 in FIG. 15 are similar to the specific operations of step ST501 and step ST503 described with reference to FIG. 5 in the first embodiment, respectively, and thus its redundant description is omitted.

The procedure determining unit 12a acquires apparatus status information from the household electrical appliance 3 (step ST1502).

Note that the order of steps ST1501 and ST1502 may be reversed or may be simultaneous.

On the basis of the apparatus function information acquired from the speech operation device 2 in step ST1501 and the apparatus status information acquired in step ST1502, the procedure determining unit 12a determines, regarding target functions of the target apparatus, execution of which functions actually results in execution of target functions based on apparatus function information (step ST1503).

Then, on the basis of the functions determined to be actually executed in step ST1503, the procedure determining unit 12a refers to the procedure DB 14 and determines operations and the order of the operations in a case where manual operation for executing the functions that are determined to be actually performed is performed on the target apparatus (step ST1504).

The operation of the household electrical appliance 3a in the apparatus control system 100a according to the second embodiment will be described.

In the household electrical appliance 3a, in addition to the operation described with reference to FIG. 7 in the first embodiment, the status information collecting unit 35 performs the operation of collecting apparatus status information.

The status information collecting unit 35 transmits the collected apparatus status information to the apparatus control device 1a.

As described above, according to the second embodiment, the apparatus control device 1a includes, in addition to the configuration of the apparatus control device 1 according to the first embodiment, the apparatus status acquiring unit 15 for acquiring information of the status of a target apparatus, and the procedure determining unit 12a determines one or more operations for executing one or more target functions and the order of the one or more operations on the basis of the information of the status acquired by the apparatus status acquiring unit 15 and the apparatus function information. Therefore, the apparatus control device 1a can perform the above-described determination operation and the process of transmitting operation commands to the household electrical appliance 3a by the operation command transmission controlling unit 13 with a small number of procedures in a short time.

This also allows a user to cause a target apparatus to execute a target function by uttered speech instructing, to the target apparatus, a difference from the current status of the target apparatus, such as "XX a little" or "YY by XX".

Note that, in the first and second embodiments described above, the target apparatuses are the household electrical appliances 3 and 3a; however, the target apparatuses are not limited to the household electrical appliances 3 and 3a. For example, any apparatus that can be manually operated by a user, such as a device installed in a factory, a smartphone, or an in-vehicle device, can be the target apparatus. To be manually operated by a user includes operation by the user using a remote controller.

In the first and second embodiments, as illustrated in FIGS. 1 and 13, the apparatus control devices 1 and 1a, the speech operation device 2, the household electrical appliances 3 and 3a, the speech input device 4, and the speech output device 5 have been described as independent devices in the apparatus control systems 100 and 100a; however, this is merely an example.

For example, the apparatus control devices 1 and 1a may be mounted on the household electrical appliances 3 and 3a, respectively. Alternatively, for example, the apparatus control device 1 or 1a and the speech operation device 2 may be mounted on the same apparatus. The speech input device 4 and the speech output device 5 may be mounted on the household electrical appliance 3 or 3a. Alternatively, as described above, the speech input device 4 and the speech output device 5 may be included in a smart speaker.

Figure 16:
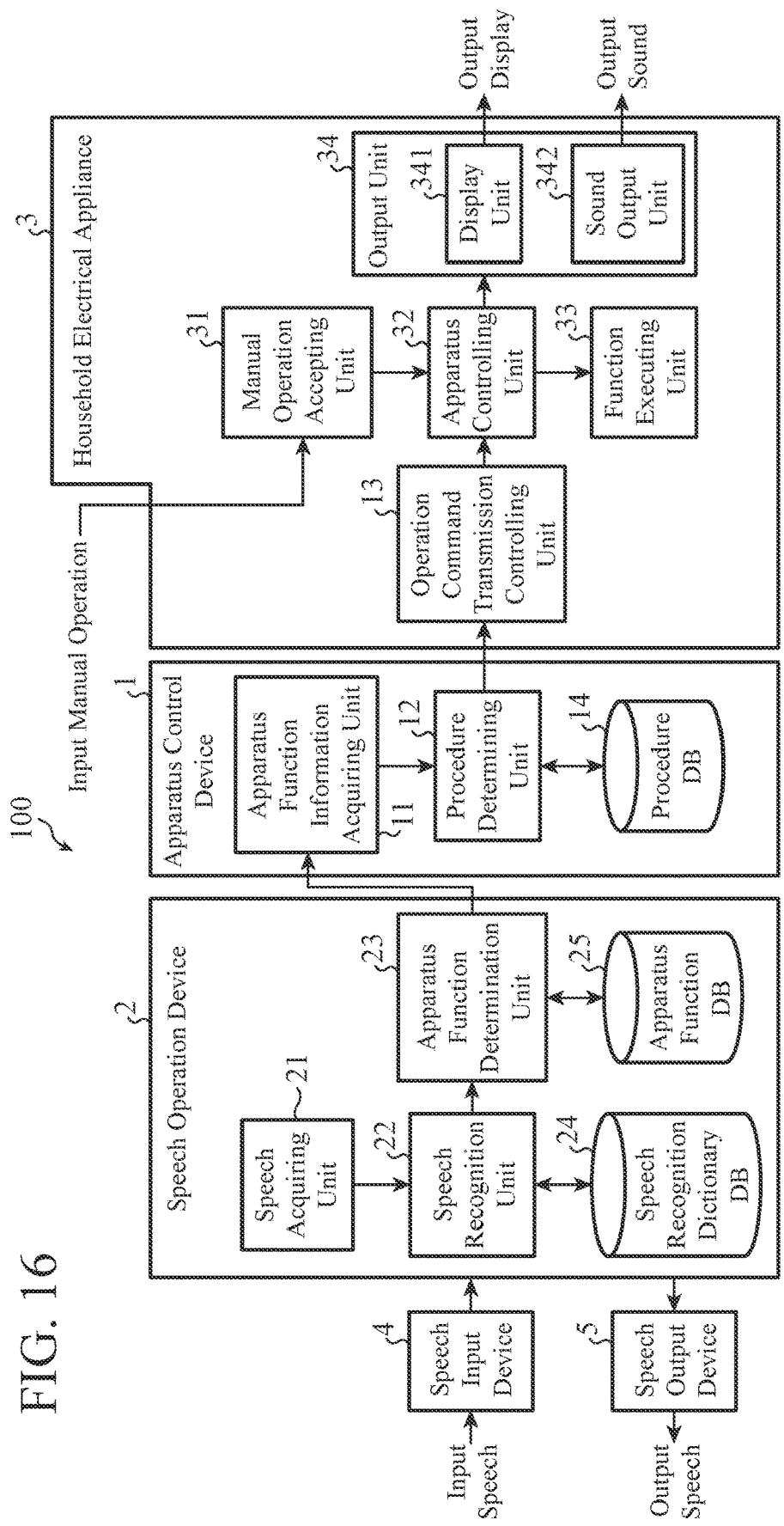
FIG. 16 is a diagram for explaining an exemplary configuration of the apparatus control system according to the first embodiment in which the function of an operation command transmission controlling unit included in the apparatus control device is included in a household electrical appliance.

Moreover, for example, in the apparatus control systems 100 and 100a, the function of the operation command transmission controlling unit 13 included in the apparatus control devices 1 and 1a may be provided to the household electrical appliances 3 and 3a, respectively (see FIG. 16). Note that FIG. 16 is a diagram illustrating an exemplary configuration in a case where the function of the operation command transmission controlling unit 13 included in the apparatus control device 1 is provided to the household electrical appliance 3 in the apparatus control system 100 according to the first embodiment.

Furthermore, for example, the apparatus control devices 1 and 1a and the speech operation device 2 may be connected to a home network, or the apparatus control devices 1 and 1a, or the apparatus control devices 1 and 1a as well as the speech operation device 2 may be included in a server outside a house and communicate with the household electrical appliances 3 and 3a in the house.

Note that the present invention may include a flexible combination of the embodiments, a modification of any component of the embodiments, or an omission of any component in the embodiments within the scope of the present invention.

INDUSTRIAL APPLICABILITY

An apparatus control device according to the present invention enables confirmation that the functions corresponding to the respective multiple manual operations have been executed in the apparatus, when a user instructs, by a single time of utterance, execution of one or more functions that require multiple manual operations in a case of manual operation, and thus the present invention is applicable to, for example, an apparatus control device that performs control for executing a function based on uttered speech on a household electrical appliance capable of executing its own function on the basis of the uttered speech.

REFERENCE SIGNS LIST

1, 1a: apparatus control device, 2: speech operation device, 3, 3a: household electrical appliance, 4: speech input device, 5: speech output device, 11: apparatus function information acquiring unit, 12, 12a: procedure determining unit, 13: operation command transmission controlling unit, 14: procedure DB, 15: apparatus status acquiring unit, 21: speech acquiring unit, 22: speech recognition unit, 23: apparatus function determining unit, 24: speech recognition dictionary DB, 25: apparatus function DB, 31: manual operation accepting unit, 32: apparatus controlling unit, 33: function executing unit, 34: output unit, 341: display unit, 342: sound output unit, 35: status information collecting unit, 100, 100a: apparatus control system, 1201: processing circuit, 1202: HDD, 1203: input interface device, 1204: output interface device, 1205: CPU, 1206: memory

The invention claimed is:

1. An apparatus control device for controlling an apparatus on a basis of uttered speech, the apparatus control device comprising:
  processing circuitry performing a process of:
  acquiring apparatus function information in which a target apparatus and one or more target functions to be executed by the target apparatus, which are determined on a basis of the uttered speech, are associated with each other;
  determining one or more manual operations for executing the one or more target functions and an order of the one or more manual operations on a basis of the apparatus function information acquired; and
  sequentially transmitting, to the target apparatus, operation commands for outputting operation response output control information corresponding to each of the one or more manual operations for each of the one or more manual operations in accordance with the order of the one or more manual operations determined.

2. The apparatus control device according to claim 1,
  wherein, in a case where the one or more manual operations include multiple manual operations having mutually a same content and multiple manual operations having mutually different content, the process sets mutually different transmission intervals for a transmission interval of operation commands at which the operation commands corresponding to the multiple manual operations having mutually the same content are transmitted successively and a transmission interval of operation commands at which the operation commands corresponding to the multiple manual operations having the mutually different content are transmitted successively.

3. The apparatus control device according to claim 2,
  wherein the transmission interval of the operation commands at which the operation commands corresponding to the multiple manual operations having mutually the same content are transmitted successively is shorter than the transmission interval of the operation commands at which the operation commands corresponding to the multiple manual operations having the mutually different content are transmitted successively.

4. The apparatus control device according to claim 1, the process further comprising:
acquiring information of a status of the target apparatus, wherein the process determines the one or more operations for executing the one or more target functions and the order of the one or more operations on a basis of the information of the status acquired and the apparatus function information.

5. The apparatus control device according to claim 1, the process further comprising:
a procedure data in which, for each of the apparatus, one or more functions of the apparatus and one or more manual operations for executing the one or more functions are associated with each other.

6. The apparatus control device according to claim 1, the process further comprising:
acquiring the uttered speech;
recognizing content of utterance on a basis of the uttered speech acquired; and
determining the target apparatus specified by the uttered speech and the one or more target functions to be executed by the target apparatus on a basis of the content of utterance recognized and outputting the apparatus function information in which the target apparatus and the one or more target functions are associated with each other,
wherein the process acquires the apparatus function information output.

7. An apparatus comprising: the apparatus control device according to claim 1; and
second processing circuitry performing a second process of:
acquiring the operation command transmitted and outputting the operation response output control information each time the operation command is acquired.

8. The apparatus according to claim 7, the second process further comprising:
outputting sound in accordance with the operation response output control information output.

9. The apparatus according to claim 8,
wherein the operation command includes operation information indicating the one or more operations, and
the second process outputs the operation response output control information for changing sound to be output depending on the operation information.

10. The apparatus according to claim 7, the second process further comprising:
displaying information based on the operation response output control information output.

11. The apparatus according to claim 10,
wherein the operation command includes operation information indicating the one or more operations, and
the second process outputs the operation response output control information for changing information to be displayed depending on the operation information.

12. An apparatus control system comprising:
an apparatus control device comprising:
processing circuitry performing a process of:
acquiring apparatus function information in which a target apparatus and one or more target functions to be executed by the target apparatus, which are determined on a basis of uttered speech, are associated with each other; and
determining one or more manual operations for executing the one or more target functions and an order of the one or more manual operations on a basis of the apparatus function information acquired; and
an apparatus that is controlled, the apparatus comprising:
second circuitry performing a second process of:
sequentially outputting operation commands for outputting operation response output control information corresponding to each of the one or more manual operations for each of the one or more manual operations in accordance with an order of the one or more manual operations determined; and
acquiring the operation commands output and outputting the operation response output control information each time one of the operation commands is acquired.

13. An apparatus control method for controlling an apparatus on a basis of uttered speech, the apparatus control method comprising:
acquiring apparatus function information in which a target apparatus and one or more target functions to be executed by the target apparatus, which are determined on a basis of the uttered speech, are associated with each other;
determining one or more manual operations for executing the one or more target functions and an order of the one or more manual operations on a basis of the apparatus function information acquired; and
sequentially transmitting operation commands for outputting operation response output control information corresponding to each of the one or more manual operations for each of the one or more manual operations in accordance with the order of the one or more manual operations determined.

14. A tangible non-transitory storage medium storing an apparatus control program for controlling an apparatus on a basis of uttered speech, the apparatus control program for causing a computer to execute a process of:
acquiring apparatus function information in which a target apparatus and one or more target functions to be executed by the target apparatus, which are determined on a basis of the uttered speech, are associated with each other;
determining one or more manual operations for executing the one or more target functions and an order of the one or more manual operations on a basis of the apparatus function information acquired; and
sequentially transmitting, to the target apparatus, operation commands for outputting operation response output control information corresponding to each of the one or more manual operations for each of the one or more manual operations in accordance with the order of the one or more manual operations determined.

* * * * *